US008274686B2

(12) United States Patent  
Furuya

(10) Patent No.: US 8,274,686 B2  
(45) Date of Patent: Sep. 25, 2012

(54) PRINT SETTING PROCESSING APPARATUS AND PRINT SETTING PROCESSING METHOD

(75) Inventor: Tomoyuki Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 12/404,947

(22) Filed: Mar. 16, 2009

(65) Prior Publication Data

US 2009/0237724 A1 Sep. 24, 2009

(30) Foreign Application Priority Data

Mar. 18, 2008 (JP) ................. 2008-070411

(51) Int. Cl.  
G06F 3/12 (2006.01)  
G06F 3/048 (2006.01)

(52) U.S. Cl. ............... 358/1.15; 358/1.13; 715/777

(58) Field of Classification Search .............. 358/1.15, 358/1.13; 715/777  
See application file for complete search history.

(56) References Cited

U.S. PATENT DOCUMENTS

| 6,661,530 | B1 | 12/2003 | Munetomo et al. |
| 2003/0053105 | A1 | 3/2003 | Morooka et al. |
| 2003/0053106 | A1* | 3/2003 | Kuroda et al. ............... 358/1.13 |
| 2006/0026600 | A1* | 2/2006 | Yoshida .............. 719/310 |

FOREIGN PATENT DOCUMENTS

| JP | H11-143664 A | 5/1999 |
| JP | 2000-118086 A | 4/2000 |
| JP | 2003-162388 A | 6/2003 |
| JP | 2007-272857 A | 10/2007 |
| JP | 2008-047069 A | 2/2008 |

OTHER PUBLICATIONS

"PrintTicket and PrintCapabilities Support in Windows Print Drivers." Microsoft Windows. Feb. 6, 2006. <http://www.microsoft.com/whdc/device/print/XPSDrv_PrintTicket.mspx>.

* cited by examiner

Primary Examiner — Twyler Haskins  
Assistant Examiner — Fred Guillermety  
(74) Attorney, Agent, or Firm — Canon USA Inc IP Division

(57) ABSTRACT

A print setting processing apparatus includes a functional information acquisition unit configured to acquire functional information which is set for each of a plurality of printer drivers, a classification unit configured to classify the functional information into a common item applicable to the plurality of printer drivers and a specified item applicable to at least a part of the printer drivers and display the classified functional information, a generation unit configured to generate integrated functional information including the common item and the specified item, and a transfer unit configured to transfer the integrated functional information to the printer drivers.

8 Claims, 29 Drawing Sheets

FIG.10

SETTABLE VALUES OF DRIVER A — 1201

```
<PrintCapabilities>
    <Feature name="RESOLUTION">
        <Option name="600dpi"/>
        <Option name="1200dpi"/>
    </Feature>
    <Feature name="PRINTING METHOD">
        <Option name="ONE-SIDED PRINTING"/>
        <Option name="TWO-SIDED PRINTING"/>
        <Option name="BOOKBINDING PRINTING"/>
    </Feature>
    <Feature name="PAGE SIZE">
        <Option name="A4"/>
        <Option name="A3"/>
        <Option name="Letter"/>
        <Option name="B5"/>
    </Feature>
    <Feature name="LAYOUT">
        <Option name="PagePerSheet:1"/>
        <Option name="PagePerSheet:2"/>
        <Option name="PagePerSheet:4"/>
        <Option name="PagePerSheet:8"/>
        <Option name="PagePerSheet:16"/>
        <Option name="Poster[2x2]"/>
        <Option name="Poster[3x3]"/>
    </Feature>
    <Feature name="ROTATE PRINTING ORIENTATION BY 180°">
        <Option name="On"/>
        <Option name="OFF"/>
    </Feature>
    <Feature name="PERFORM PRINTING IN WIDER PRINT AREA">
        <Option name="On"/>
        <Option name="OFF"/>
    </Feature>
</PrintCapabilities>
```

SETTABLE VALUES OF DRIVER B — 1201

```
<PrintCapabilities>
    <Feature name="RESOLUTION">
        <Option name="600dpi"/>
        <Option name="1200dpi"/>
    </Feature>
    <Feature name="PRINTING METHOD">
        <Option name="ONE-SIDED PRINTING"/>
        <Option name="TWO-SIDED PRINTING"/>
        <Option name="BOOKBINDING PRINTING"/>
    </Feature>
    <Feature name="PAGE SIZE">
        <Option name="A4"/>
        <Option name="A3"/>
        <Option name="Letter"/>
        <Option name="B5"/>
    </Feature>
    <Feature name="LAYOUT">
        <Option name="PagePerSheet:1"/>
        <Option name="PagePerSheet:2"/>
        <Option name="PagePerSheet:4"/>
        <Option name="PagePerSheet:8"/>
    </Feature>
    <Feature name="PERFORM BORDERLESS PRINTING">
        <Option name="On"/>
        <Option name="OFF"/>
    </Feature>
</PrintCapabilities>
```

COMMON SETTING ITEM — 1102 COMMON FUNCTION CLASSIFICATION INFORMATION

```
<COMMON SETTING ITEM>
    <Feature name="RESOLUTION">
        <Option name="600dpi"/>
        <Option name="1200dpi"/>
    </Feature>
    <Feature name="PRINTING METHOD">
        <Option name="ONE-SIDED PRINTING"/>
        <Option name="TWO-SIDED PRINTING"/>
        <Option name="BOOKBINDING PRINTING"/>
    </Feature>
    <Feature name="PAGE SIZE">
        <Option name="A4"/>
        <Option name="A3"/>
        <Option name="Letter"/>
        <Option name="B5"/>
    </Feature>
    <Feature name="LAYOUT">
        <Option name="PagePerSheet:1"/>
        <Option name="PagePerSheet:2"/>
        <Option name="PagePerSheet:4"/>
        <Option name="PagePerSheet:8"/>
    </Feature>
</COMMON SETTING ITEM>
```

DEPENDENT SETTING ITEM A — 1102 COMMON FUNCTION CLASSIFICATION INFORMATION

```
<PRINTER A SPECIFIED ITEM>
    <Feature name="LAYOUT">
        <Option name="COMMON SETTING ITEM"/>
        <Option name="PagePerSheet:16"/>
        <Option name="Poster[2x2]"/>
        <Option name="Poster[3x3]"/>
    </Feature>
    <Feature name="ROTATE PRINTING ORIENTATION BY 180°">
        <Option name="On"/>
        <Option name="OFF"/>
    </Feature>
    <Feature name="PERFORM PRINTING IN WIDER PRINT AREA">
        <Option name="On"/>
        <Option name="OFF"/>
    </Feature>
</PRINTER A SPECIFIED ITEM>
```

DEPENDENT SETTING ITEM B — 1102 COMMON FUNCTION CLASSIFICATION INFORMATION

```
<PRINTER B SPECIFIED ITEM>
    <Feature name="PERFORM BORDERLESS PRINTING">
        <Option name="On"/>
        <Option name="OFF"/>
    </Feature>
</PRINTER B SPECIFIED ITEM>
```

FIG.11

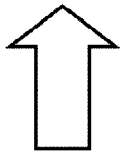

| COMMON SETTING | PRINTING APPARATUS A SPECIFIED | PRINTING APPARATUS B SPECIFIED | PRINTING APPARATUS C SPECIFIED |

1101

PAGE SIZE: A4

PRINTING ORIENTATION: PORTRAIT

PRINTING METHOD:
- ⊙ TWO-SIDED PRINTING
- ⊙ ONE-SIDED PRINTING
- ⊙ BOOKBINDING PRINTING

RESOLUTION: 600dpi

LAYOUT: 2 PAGES/SHEET
- 1 PAGE/SHEET
- 2 PAGES/SHEET
- 4 PAGES/SHEET
- 8 PAGES/SHEET

```
<COMMON SETTING ITEM>
  <Feature name="RESOLUTION">
    <Option name="600dpi"/>
    <Option name="1200dpi"/>
  </Feature>
  <Feature name="PRINTING METHOD">
    <Option name="ONE-SIDED PRINTING"/>
    <Option name="TWO-SIDED PRINTING"/>
    <Option name="BOOKBINDING PRINTING"/>
  </Feature>
  <Feature name="PAGE SIZE">
    <Option name="A4"/>
    <Option name="A3"/>
    <Option name="Letter"/>
    <Option name="B5"/>
  </Feature>
  <Feature name="LAYOUT">
    <Option name="PagePerSheet:1"/>
    <Option name="PagePerSheet:2"/>
    <Option name="PagePerSheet:4"/>
    <Option name="PagePerSheet:8"/>
  </Feature>
</COMMON SETTING ITEM>
```

COMMON SETTING ITEM     1102 COMMON FUNCTION CLASSIFICATION INFORMATION

| COMMON SETTING | PRINTING APPARATUS A SPECIFIED | PRINTING APPARATUS B SPECIFIED | PRINTING APPARATUS C SPECIFIED |

EDIT AND PREVIEW [ON ▼]

PRINT QUALITY [HIGH-SPEED ▼]

[SETTING OF FRONT AND BACK COVERS]

☑ PERFORM PRINTING IN WIDER PRINT AREA

☑ ROTATE PRINTING ORIENTATION BY 180°

☑ ALWAYS PERFORM BITMAP RASTERIZATION AT HOST SIDE

LAYOUT: [POSTER [2×2] ▼]

- USE COMMON SETTING
- 6 PAGES/SHEET
- 9 PAGES/SHEET
- 16 PAGES/SHEET
- POSTER [2×2]
- POSTER [3×3]

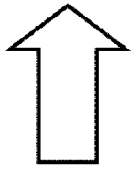

```
<PRINTER A SPECIFIED ITEM>
  <Feature name="LAYOUT">
    <Option name="COMMON SETTING ITEM"/>
    <Option name="PagePerSheet:16"/>
    <Option name="Poster[2×2]"/>
    <Option name="Poster[3×3]"/>
  </Feature>
  <Feature name="ROTATE PRINTING ORIENTATION BY 180°">
    <Option name="On"/>
    <Option name="OFF"/>
  </Feature>
  <Feature name="PERFORM PRINTING IN WIDER PRINT AREA">
    <Option name="On"/>
    <Option name="OFF"/>
  </Feature>
</PRINTER A SPECIFIED ITEM>
```

DEPENDENT SETTING ITEM A          COMMON FUNCTION
                         1102  CLASSIFICATION
                                   INFORMATION

FIG.15

COMMON SETTING VALUES    1602   CLASSIFIED PRINT SETTING VALUE INFORMATION

```
<COMMON SETTING VALUES>
  <Feature name="RESOLUTION">
    <Option name="600dpi"/>
  </Feature>
  <Feature name="PRINTING METHOD">
    <Option name="TWO-SIDED PRINTING"/>
  </Feature>
  <Feature name="PAGE SIZE">
    <Option name="A4"/>
  </Feature>
  <Feature name="LAYOUT">
    <Option name="PagePerSheet:2"/>
  </Feature>
</COMMON SETTING VALUES>
```

DEPENDENT SETTING VALUES A    1602   CLASSIFIED PRINT SETTING VALUE INFORMATION

```
<PRINTER A SPECIFIED VALUE>
  <Feature name="LAYOUT">
    <Option name="COMMON SETTING ITEM"/>
  </Feature>
  <Feature name="ROTATE PRINTING ORIENTATION BY 180°">
    <Option name="OFF"/>
  </Feature>
  <Feature name="PERFORM PRINTING IN WIDER PRINT AREA">
    <Option name="On"/>
  </Feature>
</PRINTER A SPECIFIED VALUE>
```

DEPENDENT SETTING VALUES B    1602   CLASSIFIED PRINT SETTING VALUE INFORMATION

```
<PRINTER B SPECIFIED VALUE>
  <Feature name="PERFORM BORDERLESS PRINTING">
    <Option name="On"/>
  </Feature>
</PRINTER B SPECIFIED VALUE>
```

FIG.16

1602 CLASSIFIED PRINT SETTING VALUE INFORMATION

```
<COMMON SETTING VALUE>
  <Feature name="RESOLUTION">
    <Option name="600dpi"/>
  </Feature>
  <Feature name="PRINTING METHOD">
    <Option name="TWO-SIDED PRINTING"/>
  </Feature>
  <Feature name="PAGE SIZE">
    <Option name="A4"/>
  </Feature>
  <Feature name="LAYOUT">
    <Option name="PagePerSheet:2"/>
  </Feature>
</COMMON SETTING VALUE>
```

```
<PRINTER A SPECIFIED VALUE>
  <Feature name="LAYOUT">
    <Option name="COMMON SETTING ITEM"/>
  </Feature>
  <Feature name="ROTATE PRINTING ORIENTATION BY 180°">
    <Option name="OFF"/>
  </Feature>
  <Feature name="PERFORM PRINTING IN WIDER PRINT AREA">
    <Option name="On"/>
  </Feature>
</PRINTER A SPECIFIED VALUE>
```

```
<PRINTER B SPECIFIED VALUE>
  <Feature name="PERFORM BORDERLESS PRINTING">
    <Option name="On"/>
  </Feature>
</PRINTER B SPECIFIED VALUE>
```

1103 LEAST COMMON MULTIPLE PRINT SETTING VALUE

```
<PrintTicket>
  <Feature name="RESOLUTION">
    <Option name="600dpi"/>
  </Feature>
  <Feature name="PRINTING METHOD">
    <Option name="TWO-SIDED PRINTING"/>
  </Feature>
  <Feature name="PAGE SIZE">
    <Option name="A4"/>
  </Feature>
  <Feature name="LAYOUT">
    <Option name="PagePerSheet:2"/>
  </Feature>
  <Feature name="ROTATE PRINTING ORIENTATION BY 180°">
    <Option name="OFF"/>
  </Feature>
  <Feature name="PERFORM PRINTING IN WIDER PRINT AREA">
    <Option name="On"/>
  </Feature>
  <Feature name="PERFORM BORDERLESS PRINTING">
    <Option name="On"/>
  </Feature>
</PrintTicket>
```

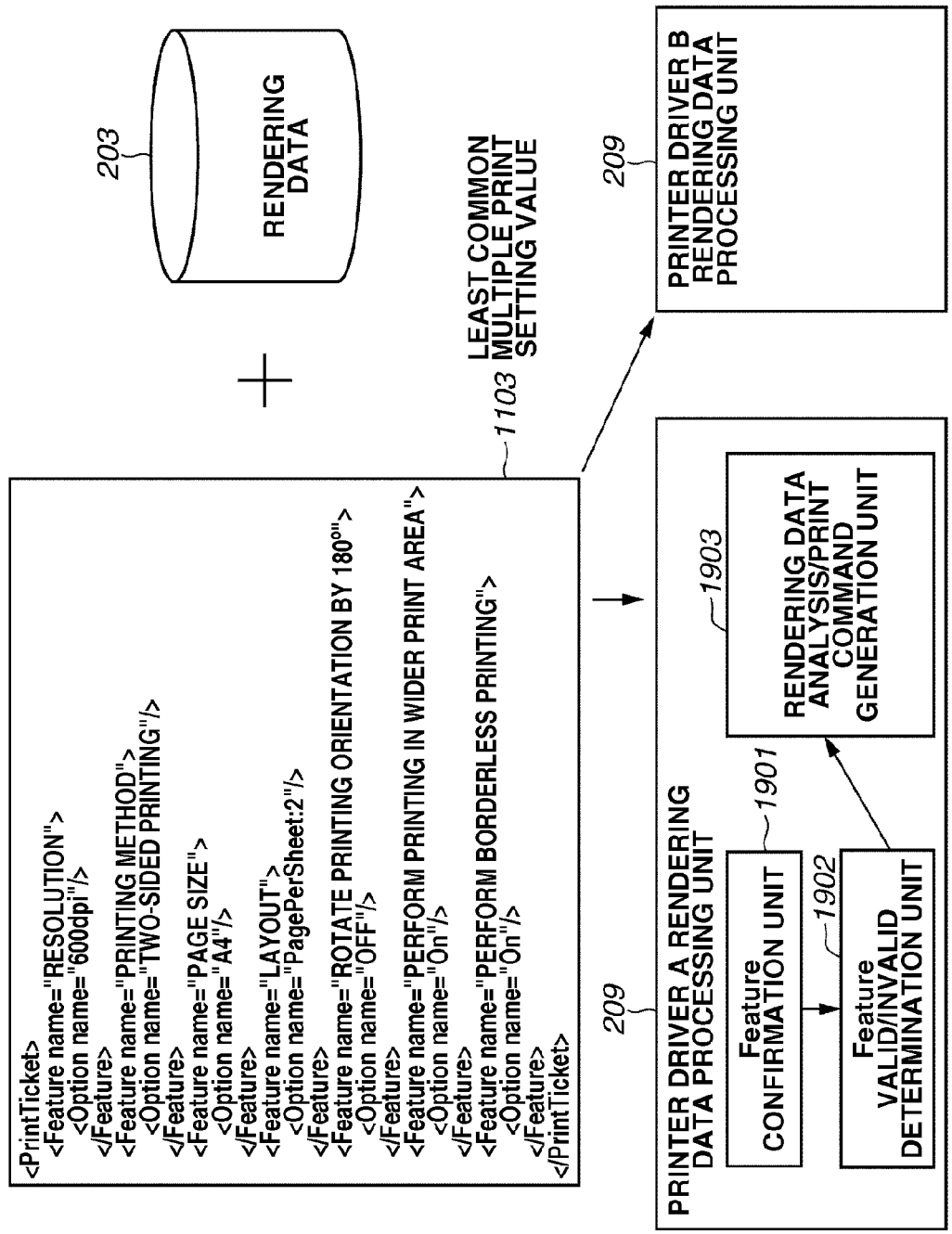

FIG.18

| COMMON SETTING | PRINTING APPARATUS A SPECIFIED | PRINTING APPARATUS B SPECIFIED | PRINTING APPARATUS C SPECIFIED |
|---|---|---|---|

STAPLE SORT | UPPER LEFT (ONE PORTION) 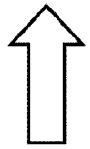
- UPPER LEFT (ONE PORTION)
- UPPER RIGHT (ONE PORTION)
- LEFT SIDE (TWO PORTIONS)
- RIGHT SIDE (TWO PORTIONS)
- TOP SIDE (TWO PORTIONS)

| COMMON SETTING | PRINTING APPARATUS A SPECIFIED | PRINTING APPARATUS B SPECIFIED | PRINTING APPARATUS C SPECIFIED |
|---|---|---|---|

FINISHING | RIGHT STAPLER AT ONE PORTION 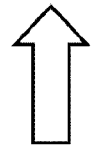
- LEFT STAPLER AT ONE PORTION
- RIGHT STAPLER AT ONE PORTION
- LEFT STAPLER AT TWO PORTIONS
- RIGHT STAPLER AT TWO PORTIONS

⇧

```
<Feature name="STAPLE SORT">
    <Option name="UPPER LEFT (ONE PORTION)"/>
    <Option name="UPPER RIGHT (ONE PORTION)"/>
    <Option name="LEFT SIDE (TWO PORTIONS)"/>
    <Option name="RIGHT SIDE (TWO PORTIONS)"/>
    <Option name="TOP SIDE (TWO PORTIONS)"/>
</Feature>
```

DEPENDENT SETTING ITEM A

1102 COMMON FUNCTION CLASSIFICATION INFORMATION

⇧

```
<Feature name="FINISHING">
    <Option name="LEFT STAPLER AT ONE PORTION"/>
    <Option name="RIGHT STAPLER AT ONE PORTION"/>
    <Option name="LEFT STAPLER AT TWO PORTIONS"/>
    <Option name="RIGHT STAPLER AT TWO PORTIONS"/>
</Feature>
```

DEPENDENT SETTING ITEM B

1102 COMMON FUNCTION CLASSIFICATION INFORMATION

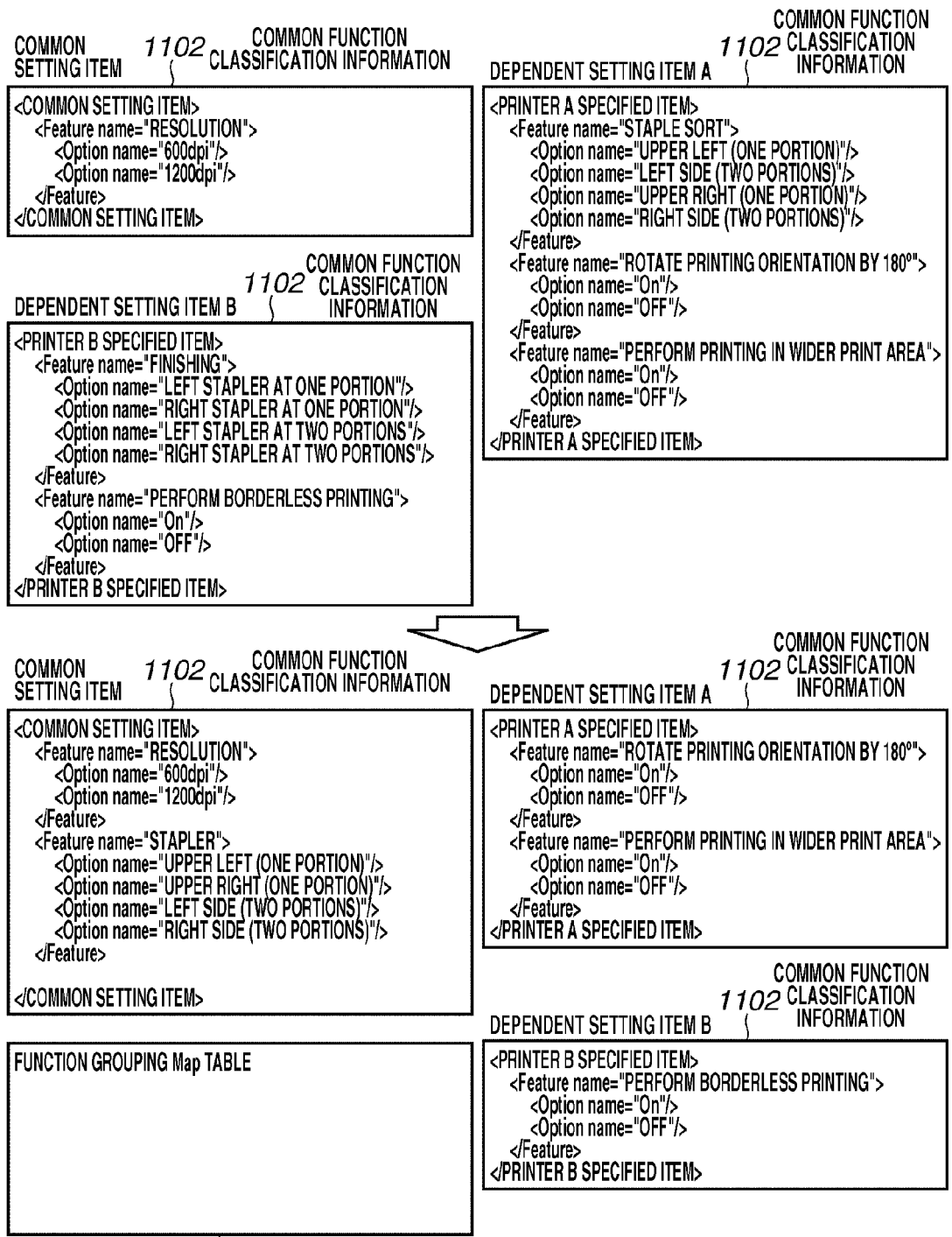

FIG.21

| COMMON SETTING | TYPE | PRINTING APPARATUS A DEPENDENT SETTING ITEM | PRINTING APPARATUS B DEPENDENT SETTING ITEM |
|---|---|---|---|
| STAPLER | Feature | STAPLE SORT | FINISHING |
| UPPER LEFT (ONE PORTION) | Option | UPPER LEFT (ONE PORTION) | LEFT STAPLER AT ONE PORTION |
| UPPER RIGHT (ONE PORTION) | Option | UPPER RIGHT (ONE PORTION) | RIGHT STAPLER AT ONE PORTION |
| LEFT SIDE (TWO PORTIONS) | Option | LEFT SIDE (TWO PORTIONS) | LEFT STAPLER AT TWO PORTIONS |
| RIGHT SIDE (TWO PORTIONS) | Option | RIGHT SIDE (TWO PORTIONS) | RIGHT STAPLER AT TWO PORTIONS |

```
typedef struct _devicemode {
  TCHAR   dmDeviceName[32];      // DEVICE NAME SUPPORTED BY DRIVER
  WORD    dmSpecVersion;         // VERSION NUMBER OF INITIALIZED DATA SPECIFICATION SERVING AS STANDARD OF STRUCTURE
  WORD    dmDriverVersion;       // VERSION NUMBER OF PRINTER DRIVER
  WORD    dmSize;                // SIZE (IN UNITS OF BYTE) EXCEPT FOR PRIVATE DRIVER DATA
  WORD    dmDriverExtra;         // BYTE LENGTH OF PRIVATE DRIVER DATA FOLLOWING THIS STRUCTURE
  DWORD   dmFields;              // DESIGNATE INITIALIZED MEMBER IN THE FOLLOWING MEMBERS
  short   dmOrientation;         // ORIENTATION OF SHEET
  short   dmPaperSize;           // SIZE OF SHEET
  short   dmPaperLength;         // LENGTH OF SHEET
  short   dmPaperWidth;          // WIDTH OF SHEET
  short   dmScale;               // SCALING FACTOR
  short   dmCopies;              // NUMBER OF COPIES
  short   dmDefaultSource;       // RESERVATION
  short   dmPrintQuality;        // RESOLUTION OF PRINTER
  short   dmColor;               // SWITCHING BETWEEN COLOR AND MONOCHROME FOR COLOR PRINTER
  short   dmDuplex;              // TWO-SIDED PRINTING
  short   dmYResolution;         // RESOLUTION IN y-DIRECTION
  short   dmTTOption;            // PRINTING METHOD FOR TrueType FONT
  short   dmCollate;             // DESIGNATE NECESSITY OF SORTING A PLURALITY OF PRINTED COPIES IN PAGE ORDER
  TCHAR   dmFormName[32];        // FORM NAME TO BE USED
  WORD    dmUnusedPadding;       // TO BE USED TO ARRANGE THE STRUCTURE ACCORDING TO DWORD BORDER
  USHORT  dmBitsPerPel;          // COLOR RESOLUTION OF DISPLAY DEVICE (BIT NUMBER PER PIXEL)
  DWORD   dmPelsWidth;           // WIDTH OF VISIBLE DEVICE SURFACE (IN UNITS OF PIXEL)
  DWORD   dmPelsHeight;          // HEIGHT OF VISIBLE DEVICE SURFACE (IN UNITS OF PIXEL)
  DWORD   dmDisplayFlags;        // DISPLAY MODE OF DEVICE
  DWORD   dmDisplayFrequency;    // FREQUENCY OF DISPLAY DEVICE IN SPECIFIC MODE
} DEVMODE;
```

FIG.27

```
701 ─┬─<PrintTicket>
702 ─┼─ <Feature name="Collate">
703 ─┴─   <Option name="On"/>
       </Feature>
       <Feature name="Duplex">
         <Option name="On"/>
       </Feature>
       <Feature name="MediaSize">
         <Option name="A4"/>
       </Feature>
       <Feature name="OutputBin">
         <Option name="Auto"/>
       </Feature>
     </PrintTicket>
```

FIG.28

```xml
801 ─<PrintCapabilities>
802 ─ <Feature name="Collate">
803 ─   <Option name="On"/>
       <Option name="OFF"/>
     </Feature>
     <Feature name="Duplex">
       <Option name="On"/>
       <Option name="OFF"/>
     </Feature>
     <Feature name="MediaSize">
       <Option name="A4"/>
       <Option name="A3"/>
       <Option name="Letter"/>
       <Option name="B5"/>
     </Feature>
     <Feature name="OutputBin">
       <Option name="Auto"/>
       <Option name="Tray1"/>
       <Option name="Tray2"/>
     </Feature>
    </PrintCapabilities>
```

PRINT SETTING PROCESSING APPARATUS AND PRINT SETTING PROCESSING METHOD

BACKGROUND OF THE INVENTION

1. Field of the Invention

The present invention relates to a print setting processing apparatus usable for print settings in an information processing apparatus such as a personal computer, and a relevant print setting processing method.

2. Description of the Related Art

Recently, various types of network devices are commonly used. For example, in a network environment including a plurality of printing apparatuses, a host PC can cause a printing apparatus having various functions to perform print processing. In such an environment, a user is required to install printer drivers corresponding to respective printing apparatuses on the host PC. When a document is printed by using an application installed on the host PC, the user needs to select an appropriate printer driver to cause the corresponding printing apparatus to perform print processing.

However, in the above-described environment, it may be difficult for the user to identify an optimum printing apparatus to be used and determine print settings (functions) to be set to obtain a desired print output.

For example, when a user instructs a staple or a bookbinding print, it may be difficult for the user to identify which printing apparatus has required functions. Even when the user can identify the printing apparatus having required functions, if the identified printing apparatus and its printer driver are not so frequently used by the user, the user may be unable to smoothly perform required print settings for the printer driver.

Print setting information can be stored when the application executes a print, so that the stored print setting information can be used for the next print execution. However, a user may be unable to accurately identify to which printer driver the stored print setting information corresponds.

Further, in a case where a printing apparatus to be used for the print execution is currently processing a great amount of print job or is malfunctioned, a user may use another printing apparatus. However, the user may be unable to identify an optimum printing apparatus as an alternate printing apparatus. Even when an appropriate alternate printing apparatus can be selected, print setting items of the alternate printing apparatus are usually different from those of the initially designated printing apparatus. The print settings of the initially designated printing apparatus cannot be directly reflected to the print settings of the alternate printing apparatus.

To solve these problems, a conventional application includes a print setting alternate function and a conventional printer driver (hereinafter, referred to as a "generic driver") includes the print setting alternate function. The print setting alternate function, for example, includes providing a unique print setting screen by which a user can easily perform print settings instead of using a print setting screen of the printer driver, or performing print processing based on settings determined using an individual setting screen provided by utilizing a printer driver of an appropriate printing apparatus. Thus, the print setting alternate function enables a user to perform print settings adequately. Further, there is a print setting alternate function which can be applied to a plurality of printing apparatuses to rearrange differences among installed functions of respective printing apparatuses and present (notify) them to a user so that the users can select an optimum printing apparatus based on the supplied information.

There is a print setting alternating application which is applied only to a specific printing apparatus or specific print settings. For example, an application for performing layout processing on print data enables a user to edit only layout settings using an individual setting screen and changes the print settings of the printer driver to prevent the printing apparatus from performing the layout processing. Such an application can be regarded as an example of the print setting alternate function.

To realize the above-described print setting alternate function, the application needs to acquire functional information and setting information about the printing apparatus from the printer driver, edit print setting contents, and cause the printer driver to perform print processing based on the updated print settings.

As a technique capable of realizing the above-described print setting alternate function, an individual interface (I/F) 601 illustrated in FIG. 26 can be used to transmit and receive the functional information and the setting information between the application and the printer driver. For example, the Microsoft Windows® operating system (OS) provides a printing system referred to as Graphics Device Interface (GDI). In the GDI printing system, a memory block referred to as a DEVMODE structure can be used to transmit and receive print setting data between the application and the printer driver.

FIG. 24 illustrates a simplified configuration of the DEVMODE structure which includes two characteristic areas (i.e., a public portion 401 and a private portion 402). The public portion 401 is opened to the public. On the other hand, only the printer driver can access the private portion 402 which is not opened to the public. The DEVMODE structure public portion 401 describes only basic functions, such as a sheet size, sheet orientation, and resolution. The private portion 402 describes the rest of the functions.

FIG. 25 illustrates an example of the public portion 401. As illustrated in FIG. 25, the DEVMODE structure is strictly regulated by Microsoft Corporation using a header file of the C language. Whereas each vendor of the printer driver can individually define the private portion 402 which follows the public portion 401 and has an expansion size designated by dmDriverExtra.

In general, items that the application can acquire or change with respect to the settings of the printer driver are limited to the items regulated in the public portion 401. The application cannot directly access the private portion 402 that describes most of the functions of the printing apparatus. In the GDI printing system, the application can use a DeviceCapabilities application programming interface (API) to acquire the functional information about the printing apparatus, including information about sheet size supported by printing apparatus and information about two-sided printing capability. The application constructs a print screen based on the acquired information. However, acquisition of specific functional information by the DeviceCapabilities API is limited to the functions defined by the Windows system. Therefore, the DeviceCapabilities API cannot be used to acquire any other functional information not defined by the Windows system.

According to the system illustrated in FIG. 26 that includes the individual I/F 601, a print setting processing unit 205 of an application program 112 acquires the DEVMODE public portion 401 from a user interface processing unit 208 of a printer driver 114 via the DEVMODE. After completing editing processing, the print setting processing unit 205 returns the DEVMODE public portion 401 to the printer driver 114 via the DEVMODE.

With regard to the DEVMODE private portion 402, an individual I/F processing unit 602 of the application program 112 requests a driver software development kit (SDK) processing unit 603 of the printer driver 114 to acquire and edit item information relating to the DEVMODE private portion 402 via the individual I/F 601. Then, the driver SDK processing unit 603 edits the DEVMODE private portion 402 and sends the edited DEVMODE private portion 402 to the user interface processing unit 208. Similarly, the application can acquire the functional information, which cannot be acquired by the DeviceCapabilities API, from the printer driver via the individual I/F 601.

In this case, the application and the printer driver are required to mutually determine a specification of the individual I/F 601 beforehand. If the specification of the individual I/F 601 is not determined beforehand, transmission/reception of information between the application and the printer driver cannot be performed sufficiently.

A text-based file, such as Extensible Markup Language (XML), can be used to transmit/receive the functional information and the setting information between the application and the printer driver. In this case, the application can acquire and edit XML keys if the application can interpret them. Therefore, a number of processible items increases, compared to the DEVMODE-based technique which performs transmission/reception of the information using binary memory blocks.

The Microsoft Windows Vista® operating system newly provides an XML Paper Specification (XPS) based printing system in addition to the conventional GDI based printing system. For example, the new XPS-based printing system is introduced in the web site (e.g., http://www.microsoft.com/japan/whdc/device/print/default.ms px). The XPS, which is one of electronic document formats, is composed of the XML that stores information relating to a document structure, rendering information, and print settings and various elements (e.g., binary resources of bitmap and font data).

An XML file that stores the print settings of the printer driver is referred to as a print ticket. The print ticket can be characterized by "described using the XML and its specification is opened to the public," "text and is therefore readable," and "accessible by not only the printer driver but also the application". Accordingly, the print ticket is functionally expanded compared to the DEVMODE.

FIG. 27 illustrates an example print ticket including a PrintTicket tag 701 in which a plurality of Feature tags 702 representing available functions is present. An Option tag 703 included in the Feature tag 702 indicates a present setting value of each function represented by the Feature.

In the XPS printing system, an XML-formatted structure "PrintCapabilities" is provided, so that the application can acquire functional information of a printing apparatus. FIG. 28 illustrates an example of the PrintCapabilities which is returned from the printer driver to the application. A PrintCapabilities tag 801 includes a plurality of Feature tags 802 each indicating a function. In the Feature tag 802, a plurality of Option tags 803 is present as candidates for a setting value of the function. The PrintCapabilities describes all functions supported by the printing apparatus and setting items of respective functions. The application can select a setting of each function based on the PrintCapabilities and can generate a print ticket including print settings.

As illustrated in FIG. 29, according to the technique using the text-based file (e.g., XML), the setting values of respective functions of the printer driver 114 can be transferred with a PrintTicket 901. Moreover, a PrintCapabilities 902 can be used to acquire functions of the printing apparatus and candidates of the setting values. The PrintTicket 901 and the PrintCapabilities 902 include texts describing Features each indicating the function and Options each indicating setting values and candidates. Therefore, the print setting processing unit 205 of the application program 112 can search for processible Features (functions) from the PrintTicket 901 and the PrintCapabilities 902 to acquire Options (setting values) and correct them. In this case, an XML analysis unit 903 of the print setting processing unit 205 performs analysis processing.

As discussed in Japanese Patent Application Laid-Open No. 11-143664 and Japanese Patent Application Laid-Open No. 2003-162388, using the above-described technique enables the application and the generic driver to acquire the functional information from the printer driver and perform functional settings or construct a print setting screen that a user can easily understand. When a plurality of printing apparatuses is usable, the print setting alternate function can be used to easily select a printing apparatus or easily perform settings of the functions.

However, only using the print setting alternate function is insufficient to effectively operate the plurality of printing apparatuses, even if selection of the printing apparatus and setting of its functions become easier.

More specifically, the print setting information that the print setting alternate function of the application can acquire from the printer driver and the print setting information that is set to the printer driver after completing editing processing are only applicable to the printer driver itself. Therefore, when print processing is performed by another printing apparatus, the print setting alternate function is again used to select an optimum printing apparatus. It is further required to perform print settings for another printer driver. For example, when the print setting alternate function selects a desired printing apparatus from the plurality of printing apparatuses, the print setting information is transmitted to a printer driver of the selected printing apparatus.

However, the selected printing apparatus may be unable to perform print processing as requested, if the printing apparatus has malfunctioned, is in a stalled state due to paper jam, or is currently performing a great amount of print job. In such cases, if the selected printing apparatus is replaced with another printing apparatus, the print setting alternate function is activated again to select another desired printing apparatus from the plurality of printing apparatuses. The print setting information is transmitted to a printer driver of the newly selected printing apparatus.

In a case where a printing apparatus stores print setting information specific thereto which is generated by the print setting alternate function of the application for a long-term reuse of the settings, the stored information cannot be reused if the printing apparatus is replaced with another printing apparatus. Therefore, print settings need to be performed again for the newly selected printing apparatus.

Moreover, when print data (e.g., XPS data) and print setting information are stored as a single document file, the document file can be directly transferred to the printing apparatus to perform direct print processing. In this case, even when the print setting alternate function is used to perform print settings suitable for a specific printing apparatus, a user may not select an appropriate printing apparatus in the direct print processing.

SUMMARY OF THE INVENTION

Exemplary embodiments of the present invention are directed to a print setting processing apparatus and a print setting processing method which enable a user to easily perform settings for a plurality of printer drivers when printing settings can be performed on the plurality of printer drivers.

According to an aspect of the present invention, a print setting processing apparatus includes a functional information acquisition unit configured to acquire functional information which is set for each of a plurality of printer drivers, a classification unit configured to classify the functional information into a common item applicable to the plurality of printer drivers and a specified item applicable to at least a part of the printer drivers and display the classified functional information, a generation unit configured to generate integrated functional information including the common item and the specified item, and a transfer unit configured to transfer the integrated functional information to the printer drivers.

According to another aspect of the present invention, a method for processing a print setting includes acquiring functional information which is set for each of a plurality of printer drivers, classifying the functional information into a common item applicable to the plurality of printer drivers and a specified item applicable to at least a part of the printer drivers and displaying the classified functional information, generating integrated functional information including the common item and the specified item, and transferring the integrated functional information to the printer drivers.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 10 illustrates an example conversion from settable values to common function classification information.

FIG. 11 illustrates an example method for generating a common setting item UI sheet.

FIG. 12 illustrates an example method for generating a dependent setting item UI sheet.

FIG. 15 illustrates examples of classified print setting value information.

FIG. 16 illustrates an example method for generating least common multiple print setting values.

FIG. 17 illustrates example processing performed by a printer driver that has received the least common multiple print setting values and rendering data.

FIG. 18 illustrates example functions that are similar but may be regarded as different functions in the common function classification information.

FIG. 20 illustrates an example change of the common function classification information according to the grouping of functions.

FIG. 21 illustrates an example function grouping Map table.

FIG. 25 illustrates an example public portion.

FIG. 27 illustrates an example PrintTicket.

FIG. 28 illustrates an example PrintCapabilities which is returned from a printer driver to an application.

DETAILED DESCRIPTION OF THE EMBODIMENTS

Figure 1:
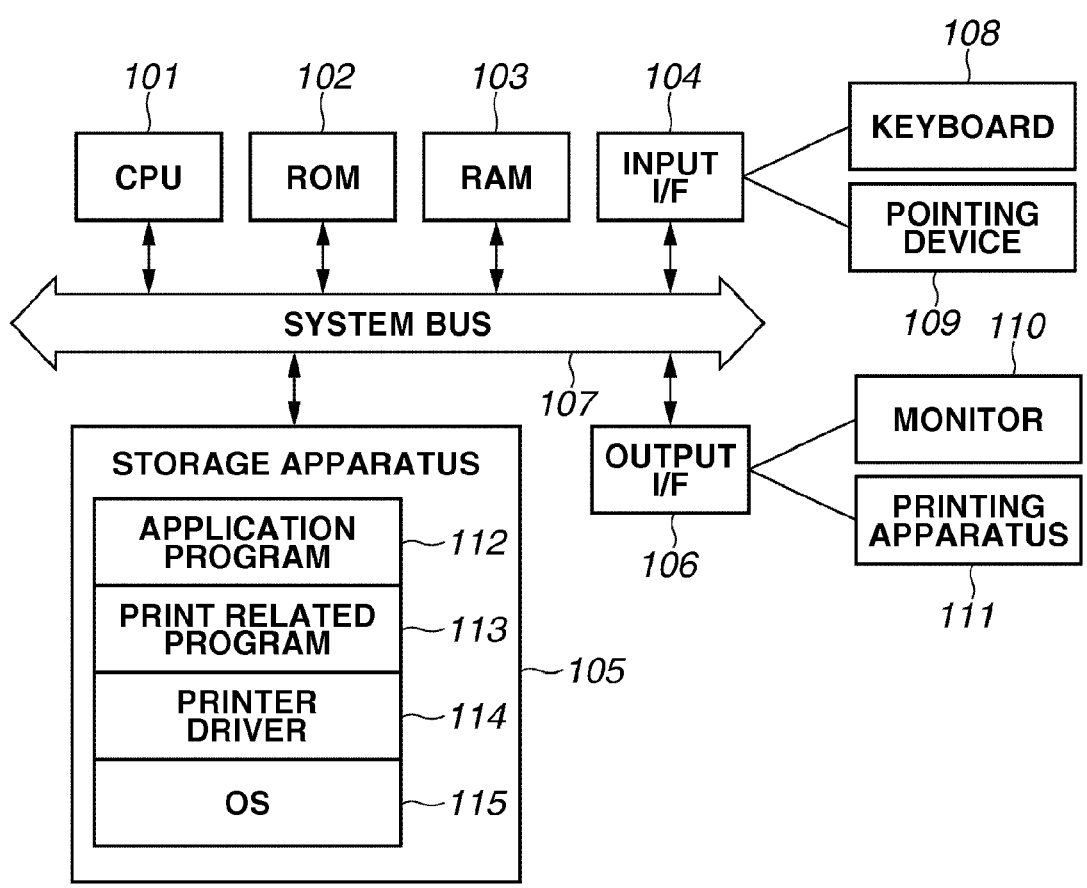
FIG. 1 is a block diagram illustrating a print setting processing apparatus according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments features, and aspects of the invention will be described in detail below with reference to the drawings.

FIG. 1 is a block diagram illustrating a print setting processing apparatus according to a first exemplary embodiment of the present invention.

The print setting processing apparatus includes a general personal computer (information processing apparatus) The print setting processing apparatus includes a central processing unit (CPU) 101, a read only memory (ROM) 102, a random access memory (RAM) 103, an input interface (I/F) 104, a storage apparatus 105, an output interface (I/F) 106, and a system bus 107. A keyboard 108 and a pointing device 109 are connected to the input I/F 104. A monitor 110 and a printing apparatus 111 are connected to the output I/F 106. The storage apparatus 105 stores an application program 112, a print related program 113, a printer driver 114, and an operating system (OS) 115.

The above-described functional units can mutually transfer information and data via the system bus 107. The CPU 101 performs entire control of the apparatus according to programs stored in the ROM 102, the RAM 103, or the storage apparatus 105. The RAM 103 can be used as a work area for the CPU 101 that performs various processing. The keyboard 108 and the pointing device 109, each functioning as an input device, transmit a user's instruction to the CPU 101 via the input I/F 104. The output I/F 106 outputs processed data to the monitor 110 or the printing apparatus 111.

Although not illustrated in FIG. 1, the present exemplary embodiment includes a plurality of printing apparatuses 111 connected to the output I/F 106. Further, the storage apparatus 105 stores a plurality of printer drivers 114 corresponding to respective printing apparatuses 111.

Figure 2:
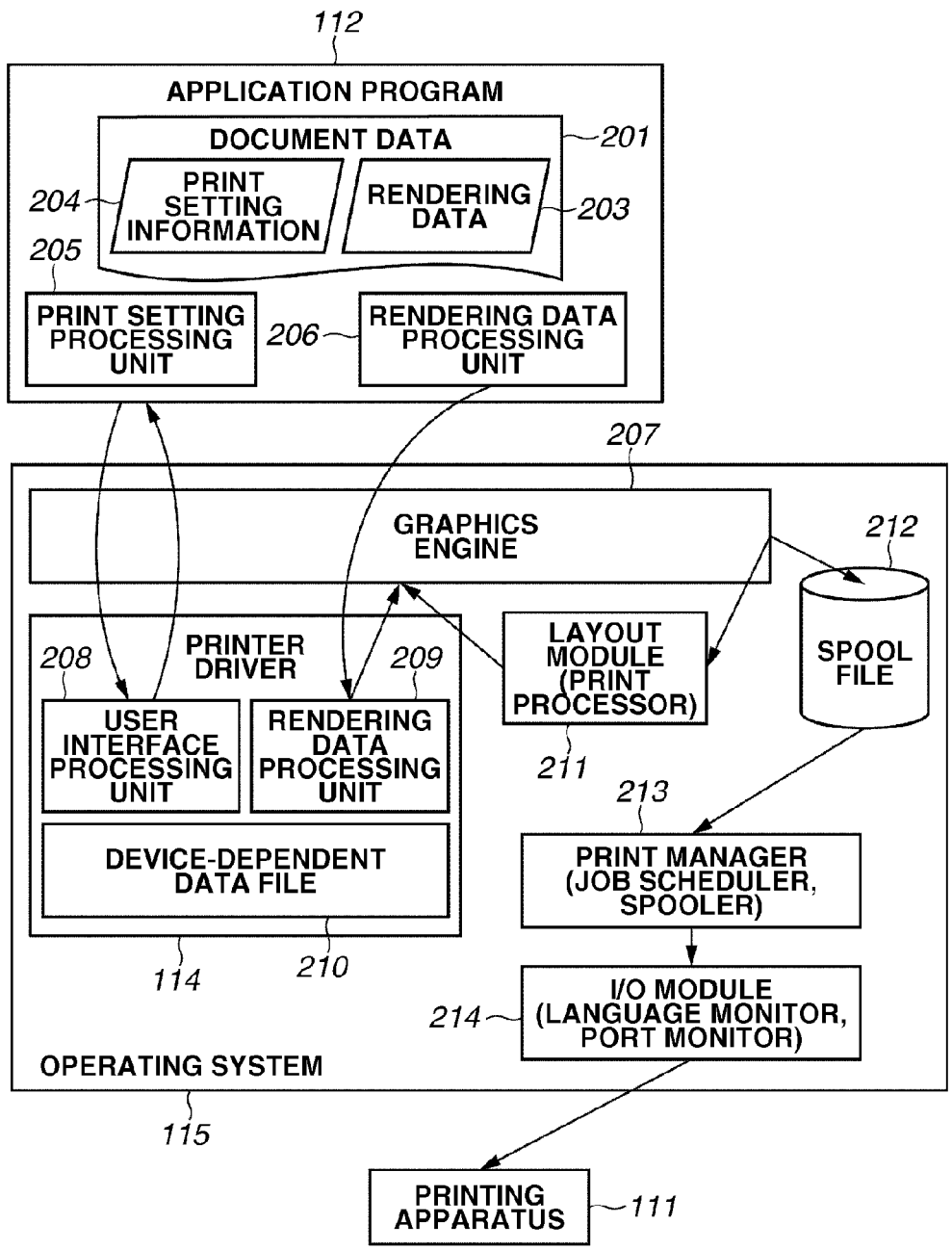
FIG. 2 illustrates an outline of print processing performed in the first exemplary embodiment.

Example print processing according to the first exemplary embodiment is described with reference to FIG. 2.

A user inputs a print processing instruction with the keyboard 108 or the pointing device 109 when the monitor 110 displays document data 201 which is generated by the user using the application program 112. The print processing performed by the CPU 101 includes three processes, selection of a printing apparatus, generation of print setting information, and conversion of rendering data, which are successively performed. These three processes are described below based on operations performed by the application program 112 and the OS 115.

First, the OS 115 selects, based on a user's instruction, a printer driver 114 corresponding to the printing apparatus 111 that executes print processing.

Next, a user interface processing unit 208 of the printer driver 114 generates initial values of print setting information 204 included in the document data 201, and acquires an instruction relating to changes of the print setting information 204. Then, a print setting processing unit 205 of the application program 112 changes the print setting information 204 according to the user's instruction and sets the print setting information 204 including the changed contents.

Figure 24:
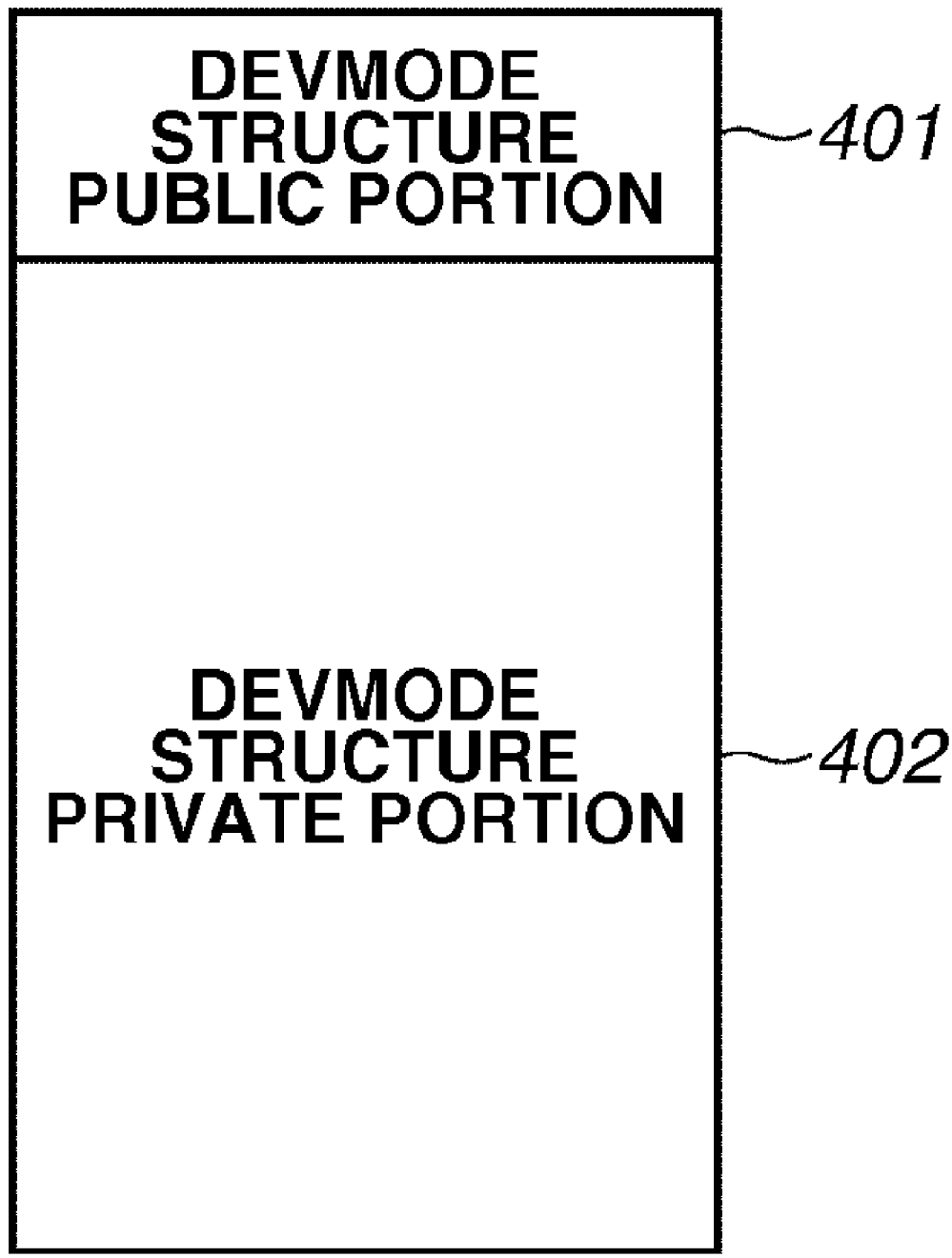
FIG. 24 illustrates a simplified configuration of a DEVMODE structure.

For example, the print setting processing unit 205 changes a sheet size to "A5" and changes a print pattern to two-sided printing. The print setting information 204 includes two types of data formats, one of which is a binary data format data structure referred to as "DEVMODE" (see FIG. 24) and the other is a markup language XML format text data using a tag referred to as a "print ticket" (see FIG. 27). These print patterns are variable depending on specifications of the printer driver 114 and the OS 115.

After completing the setting of the print setting information 204, if the user enters a print execution instruction, the application program 112 notifies the OS 115 of the print execution instruction. When the OS 115 receives the notification, a graphics engine 207 of the OS 115 generates rendering data to be supplied to the designated printer driver 114. If the print setting information 204 designates layout processing, the OS 115 generates a temporary spool file 212 before supplying the rendering data to the printer driver 114 and activates a layout module 211. The layout processing performed by the layout module 211 includes processing for changing an order of sheets and processing for locating a plurality of pages on a sheet.

The layout module 211, after completing the layout processing, transfers the rendering data 203 to the printer driver 114. A rendering data processing unit 209 of the printer driver 114 converts the received rendering data 203 into a data language (i.e., a printer control language) that the printing apparatus 111 can process. In this case, the rendering data processing unit 209 also converts the print setting information 204 into a corresponding printer control language.

The user interface processing unit 208 and the rendering data processing unit 209 are devices commonly used for a plurality types of the printing apparatuses 111. Differences of each printing apparatus 111 are described in a device-dependent data file 210 stored in the printer driver 114. The user interface processing unit 208 and the rendering data processing unit 209 can refer to the device-dependent data file 210. Converted data are successively stored as the spool file 212.

If all of the rendering processing is completed, a print manager 213 of the OS 115 acquires the spool file 212 and stores the acquired file as a print job file. The print manager 213 performs a schedule management for the print processing. When the printing apparatus 111 is in a printable state, the print manager 213 transmits print job data to the printing apparatus 111 via an input/output (I/O) module 214. In this manner, the print data supplied from the application program 112 can be converted into the printer language and printed by the printing apparatus 111.

Figure 3:
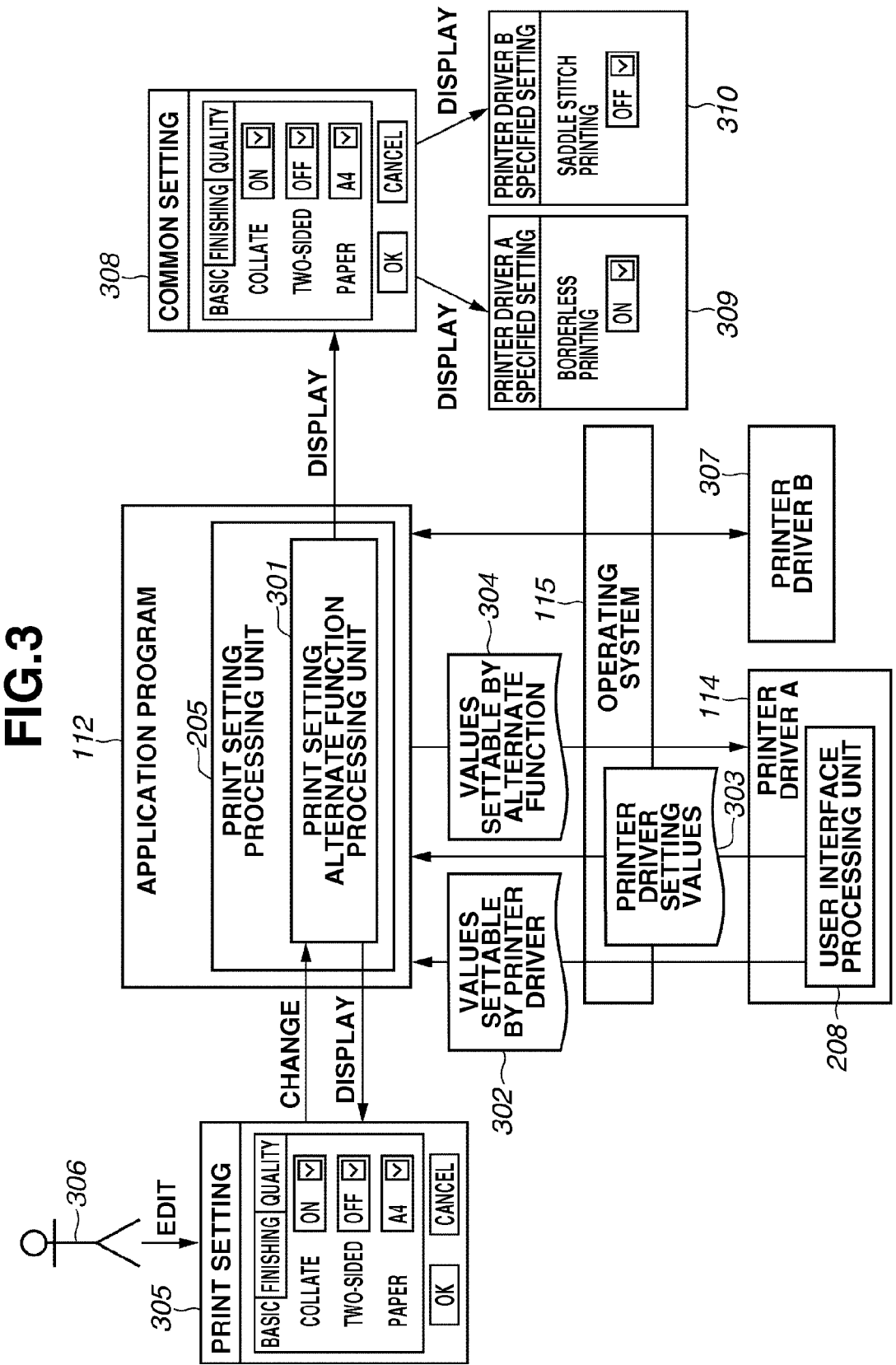
FIG. 3 illustrates a schematic configuration of a general print setting alternate function.

As a comparison with the present exemplary embodiment, a configuration of a general print setting alternate function is described below. FIG. 3 illustrates the configuration of the general print setting alternate function.

When a user performs print settings, the user can use a user interface provided by the user interface processing unit 208 of a printer driver A 114. However, when the application program 112 causes the user to perform a part or all of print settings using an individual user interface 305, instead of using the user interface provided by the printer driver A 114, the application program 112 performs processing based on the print setting alternate function.

Figure 26:
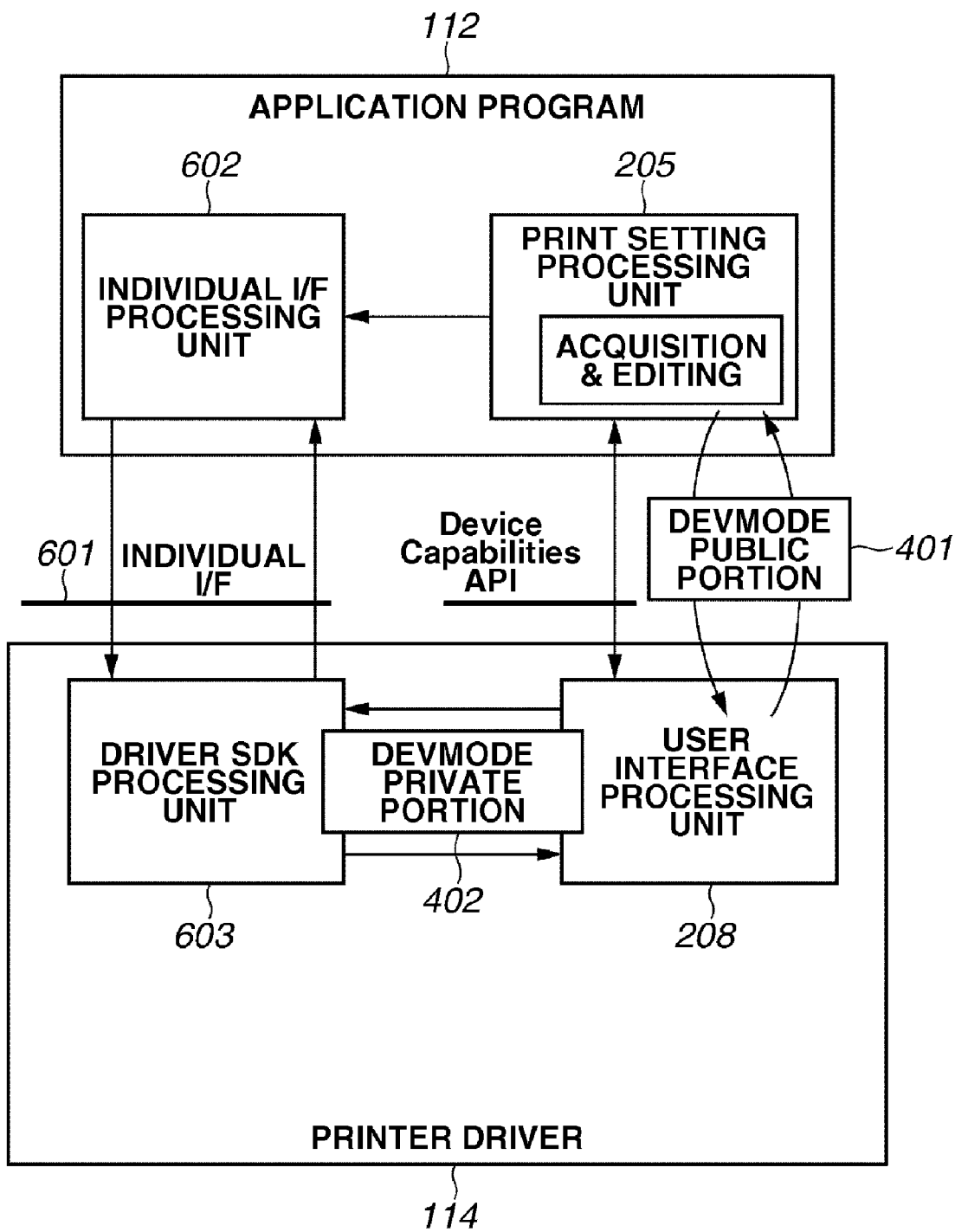
FIG. 26 illustrates a content of a conventional technique capable of realizing the print setting alternate function.
Figure 29:
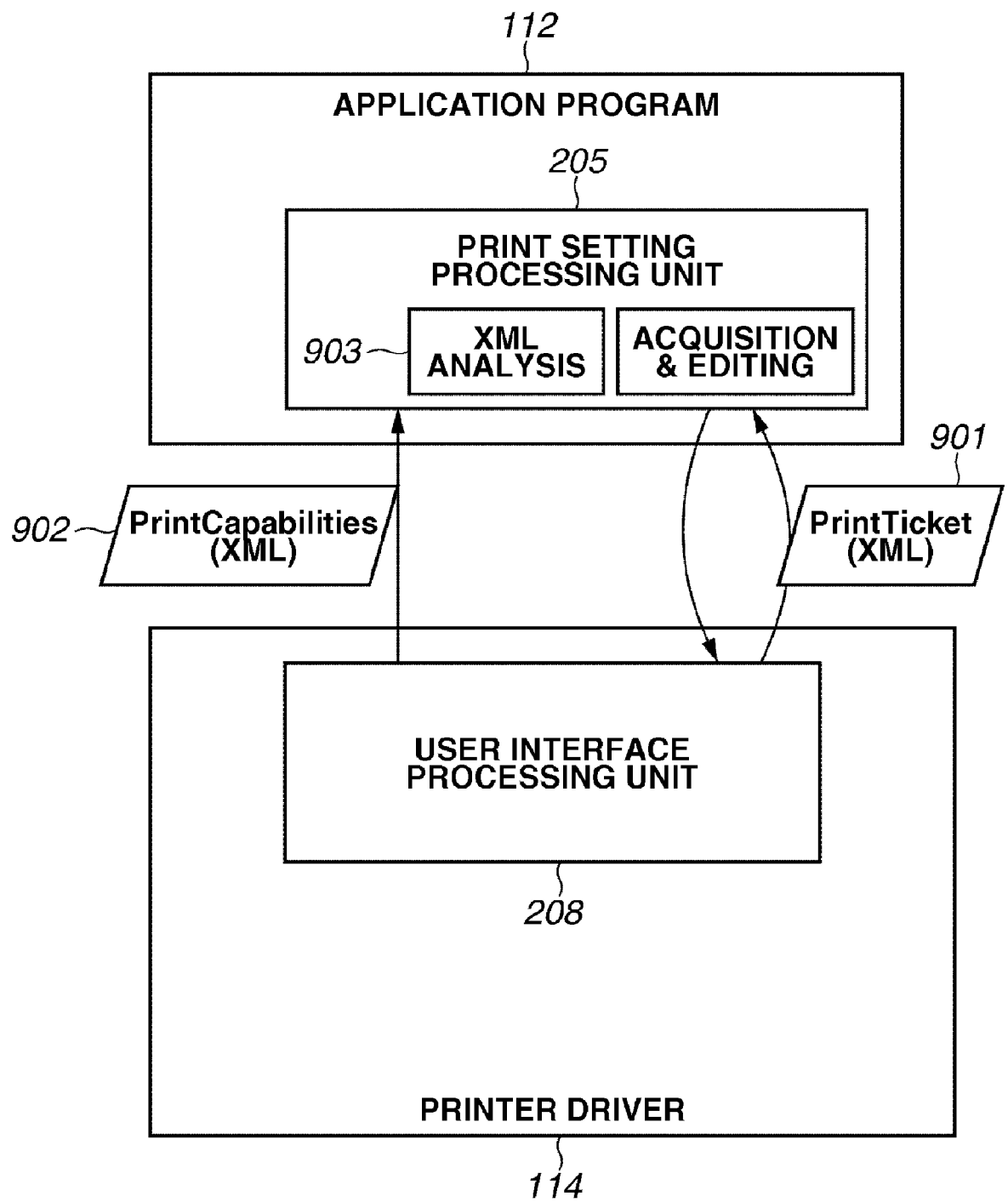
FIG. 29 illustrates a content of a technique using a text-based file, such as XML.

More specifically, a print setting alternate function processing unit 301 constitutes a part of the print setting processing unit 205 and acquires printer driver settable values 302 from the printer driver 114 using the PrintCapabilities (see FIGS. 28 and 29), the DeviceCapabilities API, or the individual I/F 601 (see FIG. 26).

Then, the print setting alternate function processing unit 301 generates the individual user interface 305 based on the printer driver settable values 302 and printer driver setting values 303 and displays the generated individual user interface 305. In this case, a name of the interface can be prepared beforehand. When the PrintCapabilities is used, any character string used in the Feature which indicates a function or the Option which indicates a setting value in the PrintCapabilities can be used. Further, any template for the layout can be prepared beforehand. When the PrintCapabilities is used, each Feature indicating the function can be itemized.

If a user 306 edits any value on the displayed individual user interface 305, a result of the editing processing is transmitted to the print setting alternate function processing unit 301. The print setting alternate function processing unit 301 generates setting values 304 according to the setting alternate function based on the editing result, and transmits the generated setting values 304 to the printer driver A 114, for example, using the DEVMODE (see FIG. 24), the individual I/F 601 (see FIG. 26), or the PrintTicket (see FIG. 27).

The print setting alternate function processing unit 301 performs alternate print setting not only for the printer driver A 114 but also for another printer driver B 307. In this case, the print setting alternate function processing unit 301 acquires printer driver settable values from the printer driver B 307. For example, the print setting alternate function processing unit 301 displays an individual common setting user interface 308, a printer driver A specified setting user interface 309, and a printer driver B specified setting user interface 310. In this case, when the printer driver settable values in the setting alternate function are transferred to the printer driver, the print setting alternate function processing unit 301 generates print settings specified to the printer driver, according to the printer driver. The general print setting alternate function can be realized in this manner.

Figure 4:
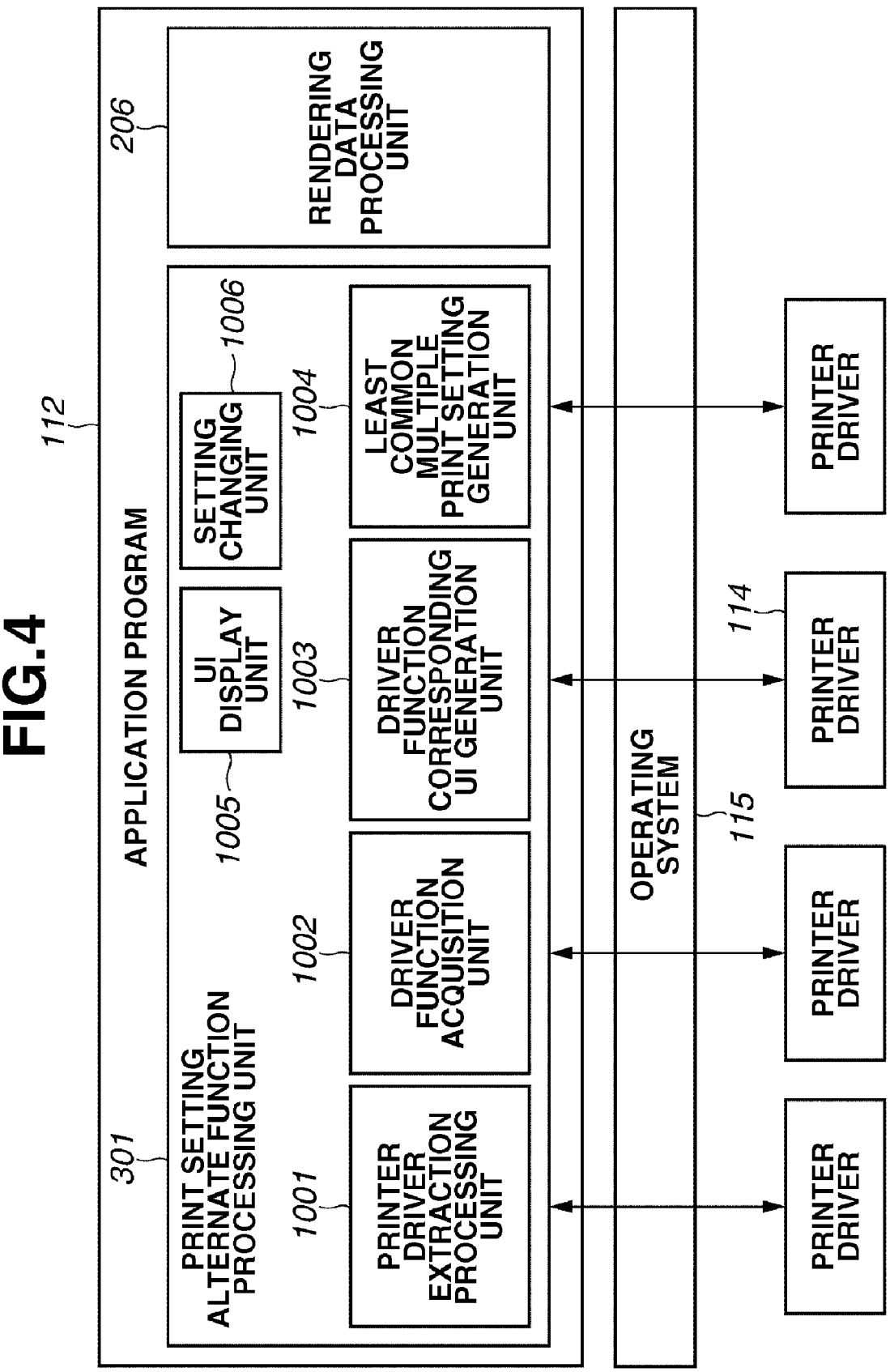
FIG. 4 illustrates a schematic configuration of a print setting alternate function according to the first exemplary embodiment.

The following is a print setting alternate function realized by the present exemplary embodiment. FIG. 4 illustrates a configuration of the print setting alternate function according to the first exemplary embodiment of the present invention.

In the first exemplary embodiment, a printer driver extraction processing unit 1001 of the print setting alternate function processing unit 301 extracts a printer driver to be subjected to the print setting alternate function processing. In this case, the printer driver extraction processing unit 1001 can extract a part or all of the printer drivers 114 installed on the OS 115 of the computer. For example, the printer driver extraction processing unit 1001 can exclude printer drivers not specified for the printing apparatuses or specific vendors. In other words, the printer driver extraction processing unit 1001 can extract only printer drivers which satisfy predetermined conditions.

Example drivers not subjected to the print setting alternate function processing include a driver that outputs a tag image file format (TIFF) Bitmap or XPS document to be used by another application program and a Fax driver that performs transmission of facsimiles. An object to be subjected to the print setting alternate function processing can be automatically specified, for example, according to a name of an output destination or the printer driver, or can be selected by a user, or can be determined based on other standard.

After the printer driver to be subjected to the print setting alternate function processing is extracted, a driver function acquisition unit 1002 which serves as a functional information acquisition unit acquires print settable values of each extracted printer driver as functional information. In the first exemplary embodiment, the driver function acquisition unit 1002 acquires the print settable values using the PrintCapabilities illustrated in FIG. 28. Then, the driver function acquisition unit 1002 stores the acquired PrintCapabilities as an XML file to store the print settable values of each printer driver.

A driver function corresponding user interface (UI) generation unit 1003 generates an individual user interface for the stored print settable values of each printer driver. A user interface (UI) display unit 1005 displays the generated individual user interface. A content of the individual user interface is described below in more detail. If the user performs print settings using the generated individual user interface, which is operable as a setting changing unit 1006, a least common multiple print setting generation unit 1004 generates least common multiple print setting information.

In other words, the setting changing unit 1006 functions as a change acceptance unit and receives a change instruction from the user. If the least common multiple print setting information is already generated, the setting changing unit 1006 functions as a changing unit and changes (updates) a content of the least common multiple print setting information. Then, the least common multiple print setting information is used as print setting information in the print processing based on rendering data generated by a rendering data processing unit 206. The content of the least common multiple setting information is described below in more detail.

Figure 5:
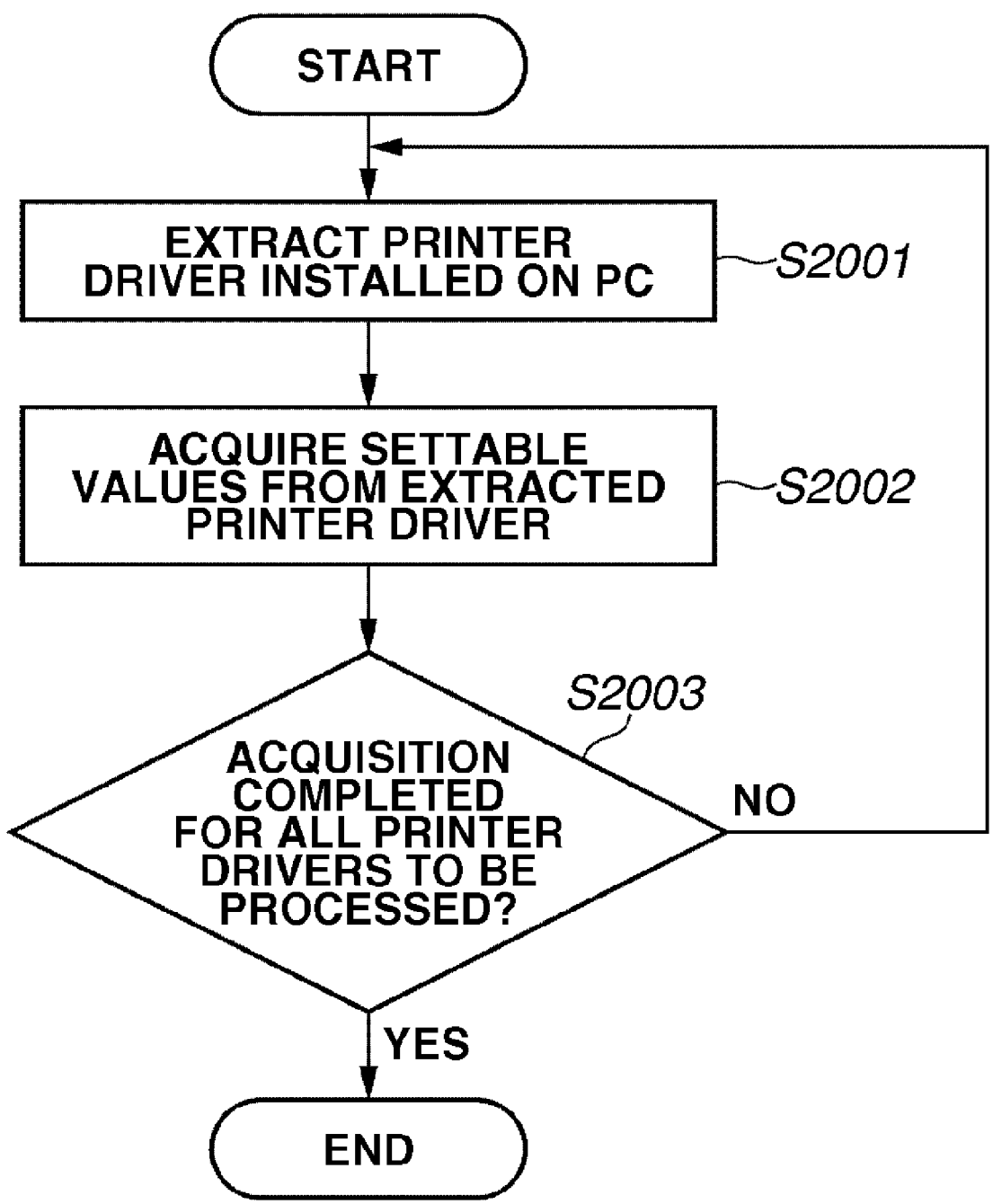
FIG. 5 is a flowchart illustrating example processing performed by a printer driver extraction processing unit and a driver function acquisition unit.

FIG. 5 is a flowchart illustrating processing performed by the printer driver extraction processing unit 1001 and the driver function acquisition unit 1002. For example, the processing illustrated in FIG. 5 starts when the application program 112 is installed, in response to an instruction entered by the user to display a user interface (UI) for print settings, and in response to an instruction entered to update the UI.

In step S2001, the printer driver extraction processing unit 1001 extracts a printer driver installed on the computer. In step S2002, the driver function acquisition unit 1002 acquires print settable values from the extracted printer driver using the PrintCapabilities, the DeviceCapabilities API, or the individual I/F. In step S2003, it is determined whether the processing of steps S2001 and S2002 has been completed for all printer drivers installed on the computer. If the acquisition of the print settable values from all printer drivers extracted by the printer driver extraction processing unit 1001 is completed for all printer drivers (YES in step S2003), the application program 112 terminates the processing of this routine.

Figure 6:
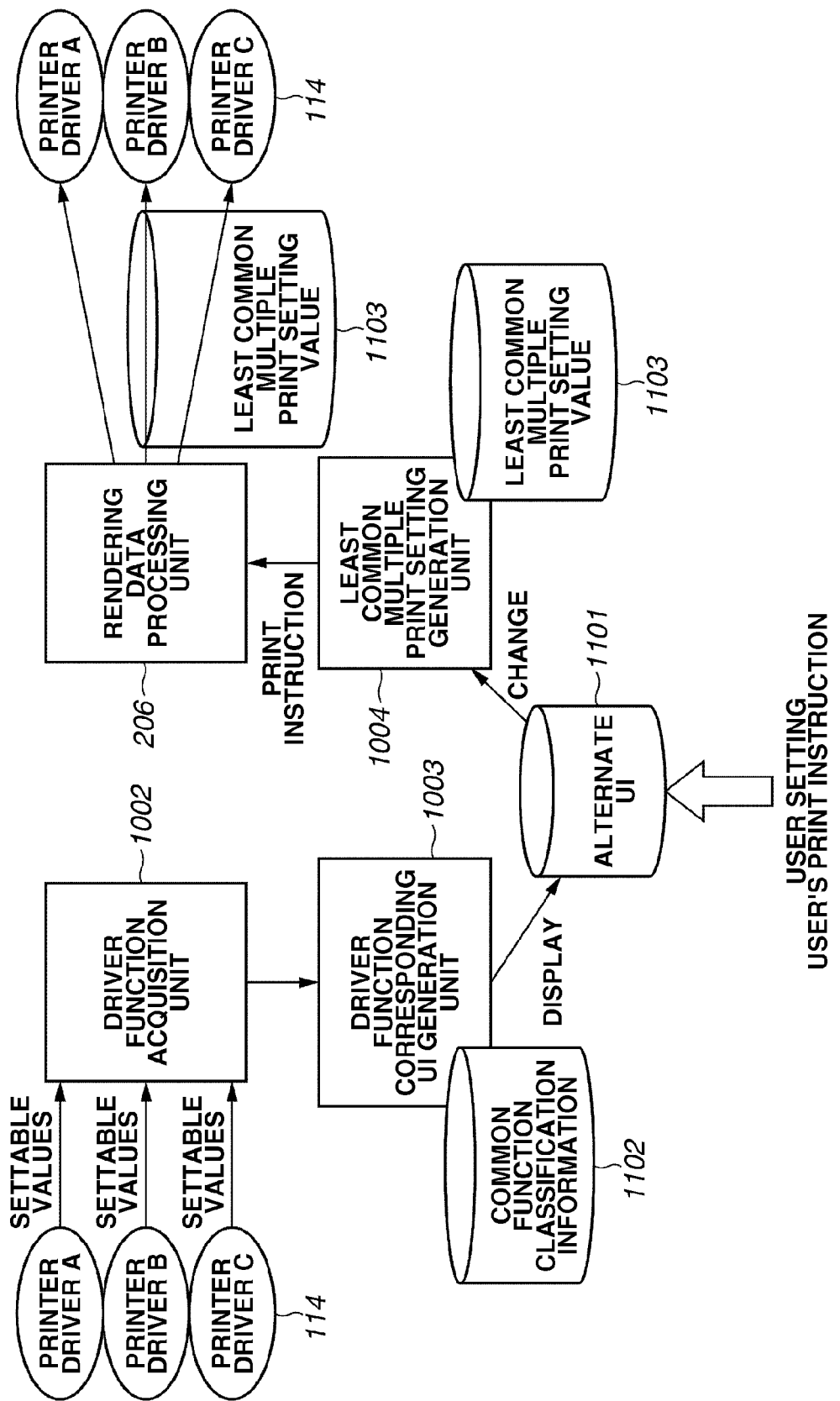
FIG. 6 illustrates operations of a print setting alternate function processing unit and a flow of print processing.

Outline of print setting alternate function processing according to the first exemplary embodiment is described below. FIG. 6 illustrates operations of the print setting alternate function processing unit 301 and a flow of print processing.

The driver function corresponding UI generation unit 1003 converts the settable values which are acquired from each printer driver by the driver function acquisition unit 1002 into common function classification information 1102. A content of the common function classification information 1102 is described below in more detail. Then, the driver function corresponding UI generation unit 1003 generates an alternate UI 1101 by integrating settings of various printer drivers based on the common function classification information 1102. The UI display unit 1005 displays the alternate UI 1101. The alternate UI 1101 enables the user to determine the settings and input a print instruction.

In response to the above-described user's operation, the least common multiple print setting generation unit 1004 generates least common multiple print setting values 1103 based on a setting status of the alternate UI 1101. If the user's operation is the print instruction, the least common multiple print setting generation unit 1004 sends the least common multiple print setting values 1103 and the print instruction to the rendering data processing unit 206. Then, the rendering data processing unit 206 sends the rendering data (print object) to the printer driver 114 and, as a transfer unit, transfers the least common multiple print setting values 1103 to perform print processing using the printer driver 114. The least common multiple print setting values 1103 are described below in more detail.

Figure 7:
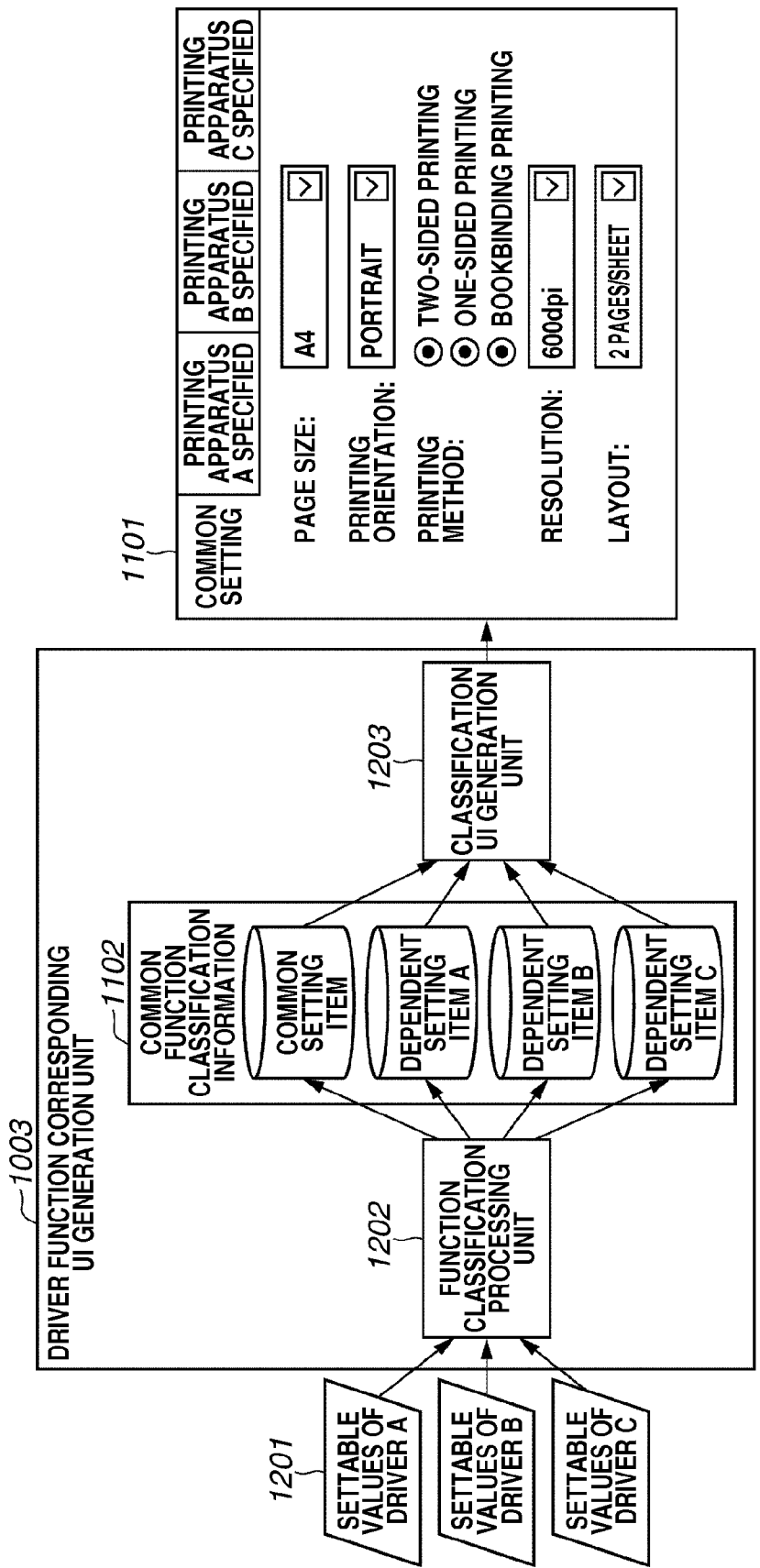
FIG. 7 illustrates an example configuration and example processing of a driver function corresponding UI generation unit.

The driver function corresponding UI generation unit 1003 is described in more detail. FIG. 7 illustrates a configuration and processing of the driver function corresponding UI generation unit 1003. In the first exemplary embodiment, the driver function corresponding UI generation unit 1003 includes a function classification processing unit 1202 and a classification UI generation unit 1203.

The function classification processing unit 1202 converts settable values 1201 which are acquired from each printer driver into the common function classification information 1102. In this case, the function classification processing unit 1202 extracts Features (functions) and Options (selection values) commonly used among the printer drivers, from the settable values 1201 acquired from respective printer drivers, and classifies the extracted Features and Options into a common setting item or a dependent setting item of each driver.

Figure 8:
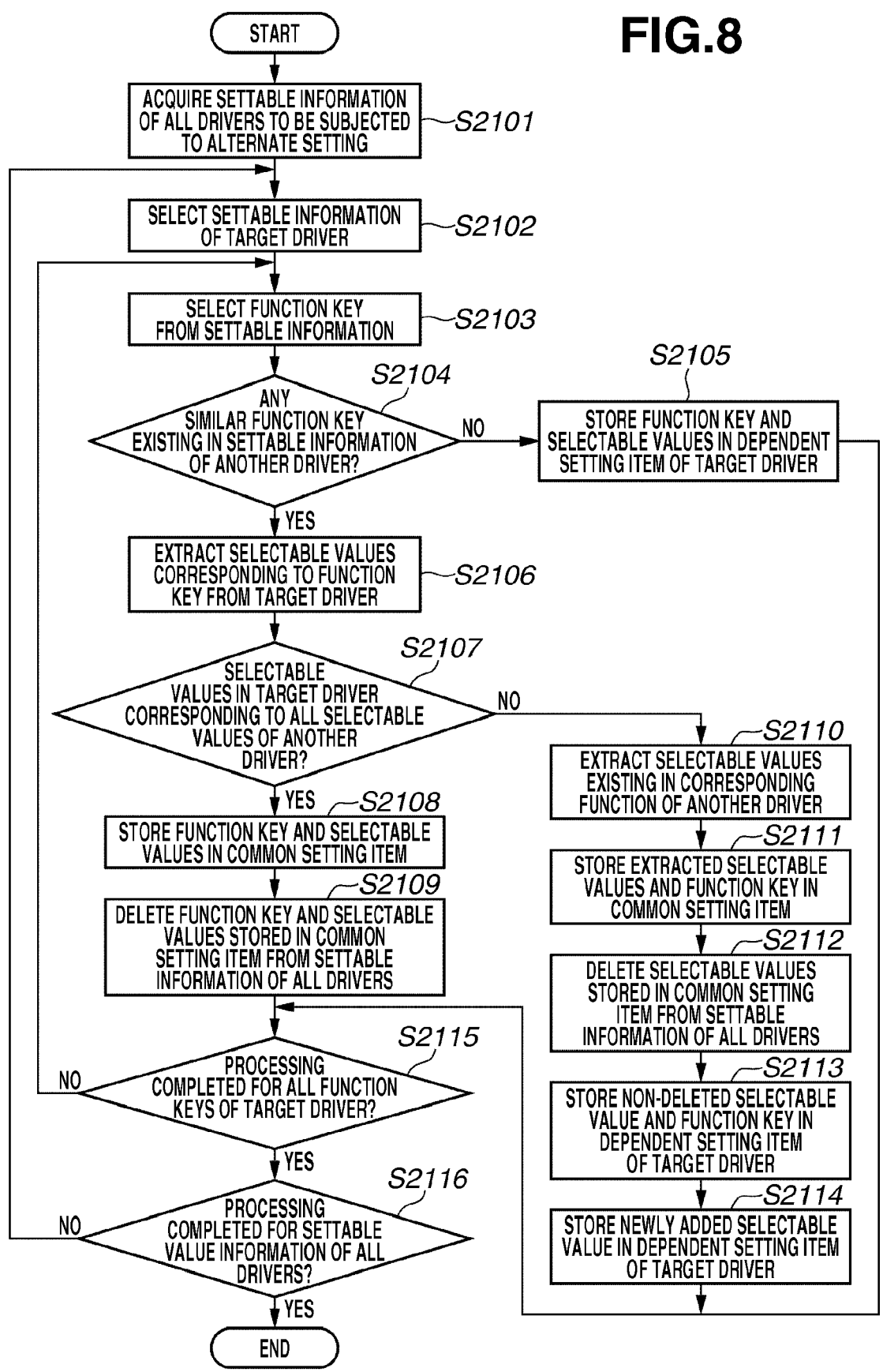
FIG. 8 is a flowchart illustrating example processing performed by a function classification processing unit.

FIG. 8 is a flowchart illustrating processing performed by the function classification processing unit 1202. For example, the function classification processing unit 1202 starts the processing illustrated in FIG. 8 in response to an instruction entered by a user to display the alternate UI 1101. Alternatively, the processing illustrated in FIG. 8 can be started following the processing illustrated in FIG. 5 when the application program 112 is installed and in response to an instruction entered to update the alternate UI 1101. The display of the alternate UI 1101 can be omitted if it is not the first (initial) time. In particular, if the installed printer driver is not updated, the display of the alternate UI 1101 can be omitted to realize high-speed processing.

In step S2101, the function classification processing unit 1202 acquires settable information (settable values) of all drivers to be subjected to alternate settings which are acquired by the driver function acquisition unit 1002. In step S2102, the function classification processing unit 1202 selects settable information of one driver (i.e., a target driver). In step S2103, the function classification processing unit 1202 selects a function key indicating the function (e.g., Feature) from the selected settable information.

In step S2104, the function classification processing unit 1202 determines whether settable information of any other driver includes a similar function key. If there is no similar function key in the other drivers (NO in step S2104), then in step S2105, the function classification processing unit 1202 stores the function key and selectable values which are described by the Option in the dependent setting item of the target driver which are prepared beforehand.

If any similar function key is present in the other drivers (YES in step S2104), then in step S2106, the function classification processing unit 1202 extracts selectable values corresponding to the function key from the target driver. Next, in step S2107, the function classification processing unit 1202 determines whether all of the selectable values of the target driver are present in the other driver. If all of the selectable values of the target driver are present in the other driver (YES in step S2107), then in step S2108, the function classification processing unit 1202 stores the function key and the selectable values of the target driver in the common setting item which are prepared beforehand. In step S2109, the function classification processing unit 1202 deletes, from the settable information of all drivers, the function key and the selectable values which are stored in the common setting item.

If at least one of the selectable values is not present in the other driver (NO in step S2107), then in step S2110, the function classification processing unit 1202 extracts selectable value(s) existing in a corresponding function key of the other driver. In step S2111, the function classification processing unit 1202 stores the extracted selectable value and the function key in the common setting item. In step S2112, the function classification processing unit 1202 deletes the selectable values stored in the common setting item from the settable information of all drivers.

In step S2113, the function classification processing unit 1202 stores the non-deleted selectable value(s) and the function key in the dependent setting item of the target driver. In step S2114, the function classification processing unit 1202 newly adds a selectable value of "usage of common setting item" and stores the newly added selectable value in the dependent setting item of the target driver.

In step S2115, the function classification processing unit 1202 determines whether the processing of steps S2103 to S2114 has been completed for all function keys included in the selectable information of the target driver. In step S2116, the function classification processing unit 1202 determines whether the processing of steps S2103 to S2115 has been completed for the settable information of all drivers. If the processing of steps S2103 to S2115 has been completed for the settable value information of all drivers (YES in step S2116), the function classification processing unit 1202 terminates the processing of this routine.

The classification UI generation unit 1203 generates the alternate UI 1101, in which the settings of various printer drivers are integrated, based on the common function classification information 1102. In this case, the classification UI generation unit 1203 generates independent UI sheets corresponding to the common setting item and the dependent setting item of the common function classification information 1102 respectively.

Figure 9:
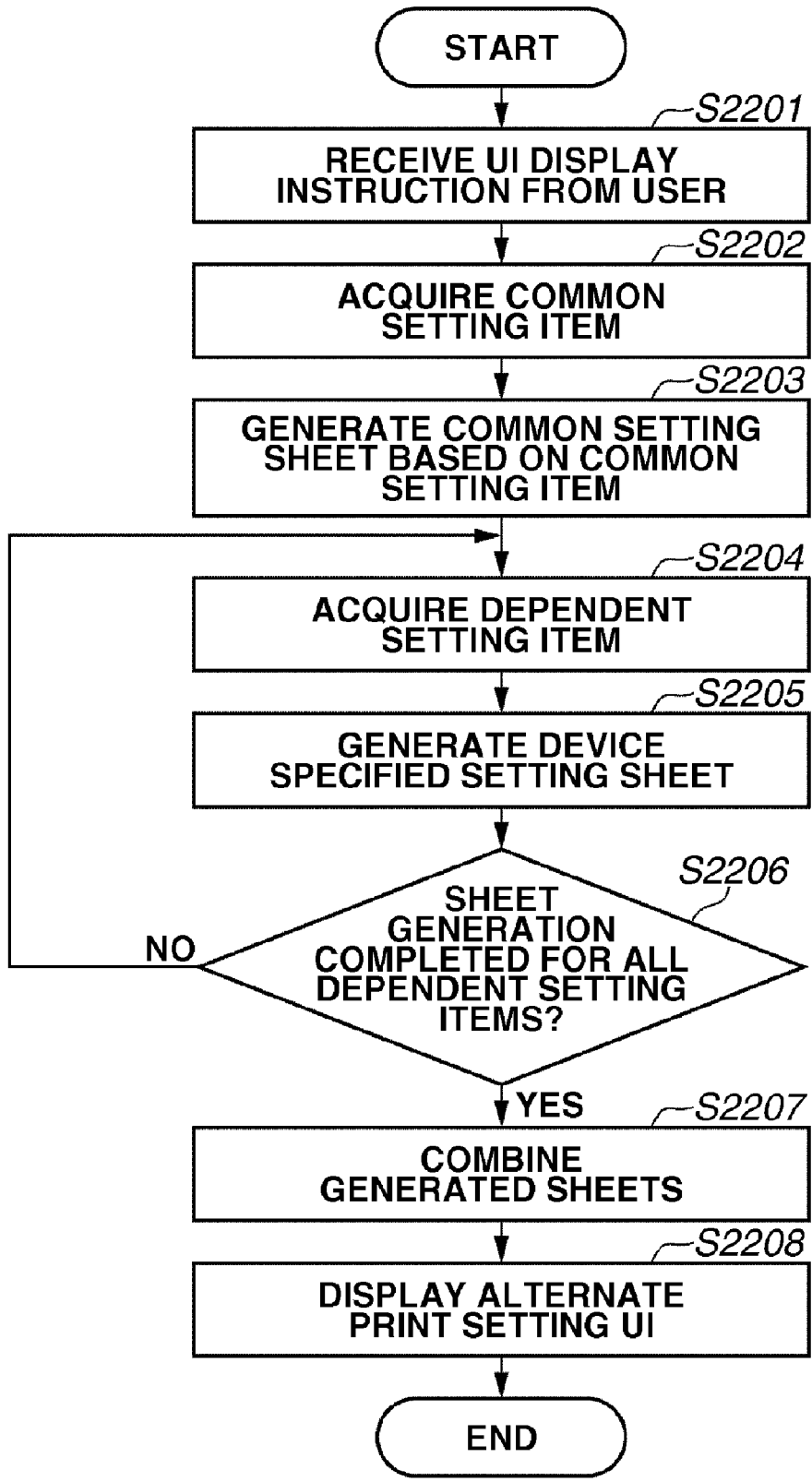
FIG. 9 is a flowchart illustrating example processing performed by a classification UI generation unit.

FIG. 9 is a flowchart illustrating processing performed by the classification UI generation unit 1203. For example, the classification UI generation unit 1203 starts the processing when the alternate UI 1101 is displayed.

In step S2201, the classification UI generation unit 1203 starts its operation when the print setting alternate function processing unit 301 receives an instruction from the user to display the alternate UI 1101. In step S2202, the classification UI generation unit 1203 acquires the common setting item. In step S2203, the classification UI generation unit 1203 generates a common setting sheet based on the common setting item. In step S2204, the classification UI generation unit 1203 acquires the dependent setting items. In step S2205, the classification UI generation unit 1203 generates a device specified setting sheet.

The processing of steps S2204 and S2205 is repeated until the device specified setting sheets are generated for all dependent setting items of each printer driver (i.e., the target of the alternate UI 1101). In step S2206, if the classification UI generation unit 1203 determines that the device specified setting sheets for all dependent setting items have been completely generated (YES in step S2206), then in step S2207, the classification UI generation unit 1203 combines the common setting sheet and device specified setting sheets to generate an integrated user interface screen. In step S2208, the classification UI generation unit 1203 displays the generated alternate print setting UI as the alternate UI 1101. Then, the classification UI generation unit 1203 terminates the processing of this routine.

FIG. 10 illustrates an example conversion from settable values 1201 to the common function classification information 1102. FIG. 11 illustrates an example method for generating a common setting item UI sheet. FIG. 12 illustrates an example method for generating a dependent setting item UI sheet.

As illustrated in FIG. 10, the function classification processing unit 1202 uses the PrintCapabilities (see FIG. 28) that describes settable values for the printer driver A and the printer driver B, and generates the common function classification information 1102 based on the PrintCapabilities. The common function classification information 1102 includes the Feature indicating the function and the Options corresponding to the Features which are classified into the common setting item or a printer specified dependent setting item, and are individually stored as XML files.

More specifically, the function classification processing unit 1202 stores the Features in the common setting item, if the same Features are present in both the printer driver A and the printer driver B. For example, "resolution", "printing method", "page size" and "layout" are common Feature names and therefore stored in the common setting item.

Further, the function classification processing unit 1202 stores the Options corresponding to the Features stored in the common setting item, if the same Options are present in both the printer driver A and the printer driver B. For example, in the items of the Feature name "resolution", two Option names "600 dpi" and "1200 dpi" are common values and therefore stored in the common setting item. On the other hand, if the printer driver A and the printer driver B include different Options (e.g., the options in the Feature name "layout"), only the same Options are stored in the common setting item.

The function classification processing unit 1202 stores the Feature in the dependent setting item generated for each printer driver if the Feature is present only in the specific printer driver. For example, Feature names "rotate printing orientation by 180°", "perform printing in wider print area", and "perform borderless printing" are specified for each printer driver and are therefore stored in the dependent setting item.

As described in the "layout" of the <printer A specified item>, if a part of the Options is stored in the common setting item, the Features and the Options not stored in the common setting item are stored in the dependent setting item and a new Option "usage of common setting item" is added. When the Option "usage of common setting item" is selected as a setting, the Option in the common setting item is valid.

In the first exemplary embodiment, as described above, the settable values 1201 of each printer driver are classified into the common setting item or the dependent setting item of the common function classification information.

The common setting item and the dependent setting item are independent XML files, or can be a single XML file using tags for classifying the items and a binary file since only the classification method and the order becomes different.

To generate the common setting item UI sheet, as illustrated in FIG. 11, the classification UI generation unit 1203 generates the common setting sheet based on the common setting item of the common function classification information 1102. According to the illustrated example, layout of each setting item is associated with a position of the Features according to a rule prepared beforehand. However, the Feature names and the Option names can be arbitrarily arranged. In particular, Features not applicable to the rule prepared beforehand can be arbitrarily arranged.

To generate the dependent setting item (printing apparatus specified setting item) UI sheet, as illustrated in FIG. 12, the classification UI generation unit 1203 generates a printer specified value setting sheet based on the dependent setting items of the common function classification information. As illustrated in FIG. 12, the Option "usage of common setting item" which is added by the function classification processing unit 1202 is also displayed as one of selection items.

Figure 13:
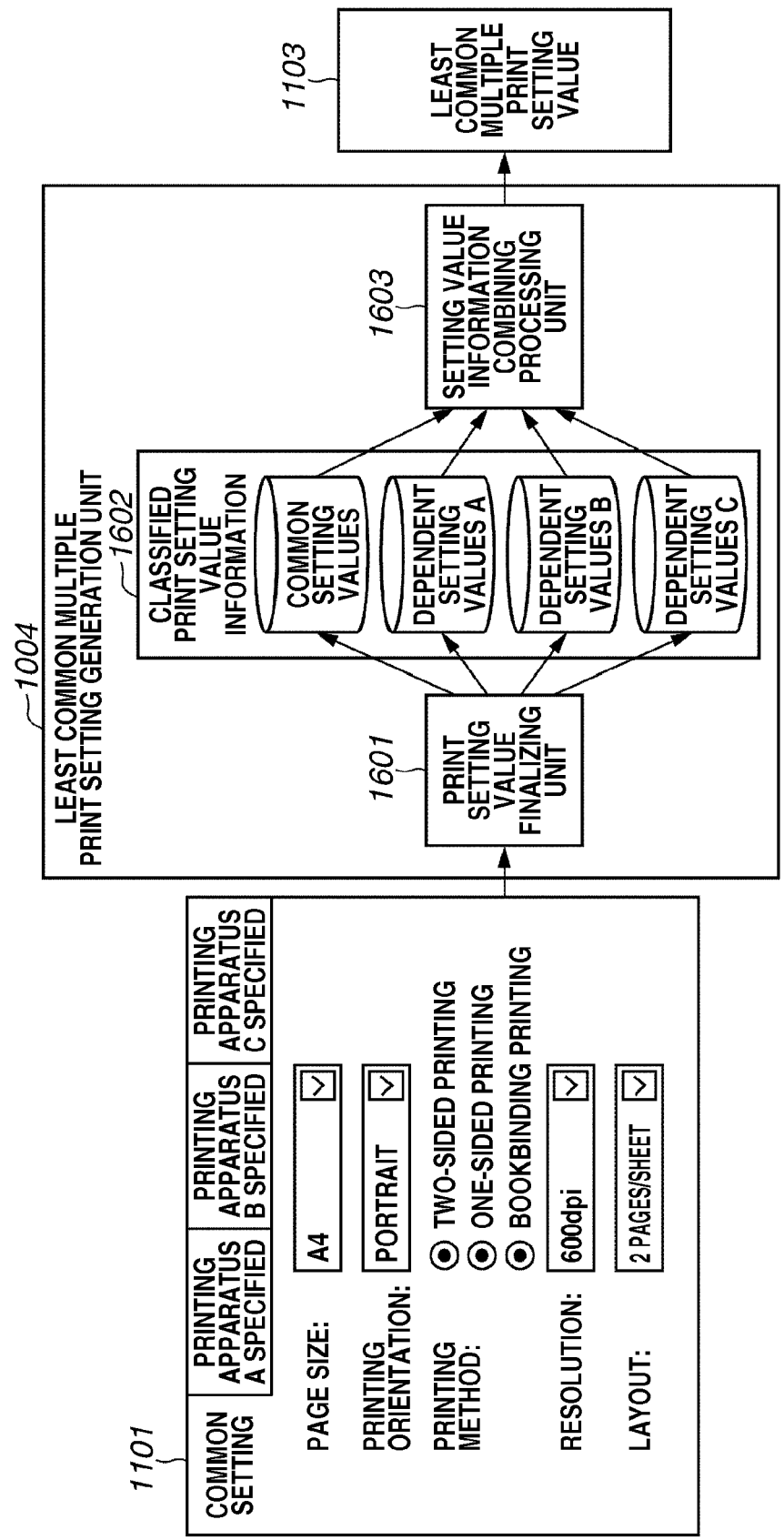
FIG. 13 illustrates an example configuration and example processing of a least common multiple print setting generation unit.

The least common multiple print setting generation unit 1004 is described below in more detail. FIG. 13 illustrates a configuration and processing of the least common multiple print setting generation unit 1004. In the first exemplary embodiment, the least common multiple print setting generation unit 1004 includes a print setting value finalizing unit 1601 and a setting value information combining processing unit 1603.

The print setting value finalizing unit 1601 is activated when the user finalizes the settings using the alternate UI 1101 and when the user inputs a print instruction. The print setting value finalizing unit 1601 generates classified print setting value information 1602. The classified print setting value information 1602 is expressed by, for example, the common setting values and the dependent setting values. In the first exemplary embodiment, the print setting value finalizing unit 1601 allocates the values which are set using the common setting sheet of the alternate UI 1101 as the common setting values and allocates the values which are set using the device specified setting sheet of the alternate UI 1101 as the dependent setting values.

A combination of the Options designated by the alternate UI 1101 for respective Features is stored as an XML file, whose detailed content is described below with reference to FIG. 15. A relationship between the common function classification information 1102 and the classified print setting value information 1602 is similar to a relationship between the PrintCapabilities describing selection items of respective Features and the PrintTicket describing setting values of respective Features.

The setting value information combining processing unit 1603 generates the least common multiple print setting values 1103 as integrated functional information based on the classified print setting value information 1602.

Figure 14:
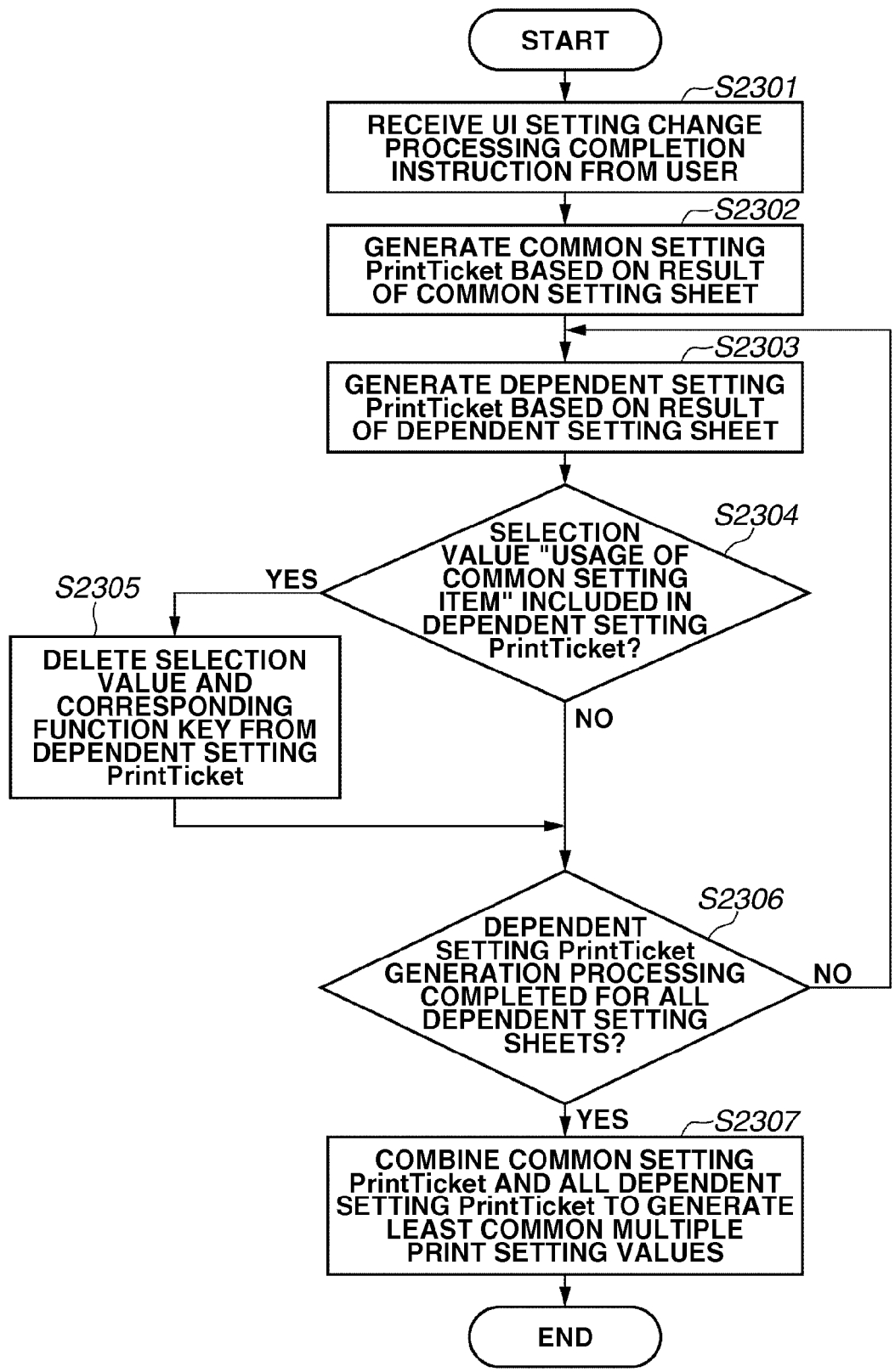
FIG. 14 is a flowchart illustrating example processing performed by the least common multiple print setting generation unit.

FIG. 14 is a flowchart illustrating processing performed by the least common multiple print setting generation unit 1004. For example, the least common multiple print setting generation unit 1004 starts the processing when the setting changes on the displayed alternate UI 1101 are finalized by the user and when the print instruction is entered.

In step S2301, the least common multiple print setting generation unit 1004 starts its operation when the print setting alternate function processing unit 301 receives an instruction from the user to finalize the setting changes on the alternate UI 1101 or an instruction to display a print instruction. In step S2302, the least common multiple print setting generation unit 1004 generates a common setting PrintTicket based on a result of the common setting sheet.

In step S2303, the least common multiple print setting generation unit 1004 generates a dependent setting PrintTicket based on a result of the dependent setting sheet. In step S2304, the least common multiple print setting generation unit 1004 determines whether the dependent setting PrintTicket includes a selection value "usage of common setting item." If the selection value "usage of common setting item" is present (YES in step S2304), then in step S2305, the least common multiple print setting generation unit 1004 deletes the selection value and the corresponding function key indicating the function from the dependent setting PrintTicket.

In step S2306, the least common multiple print setting generation unit 1004 determines whether the processing of steps S2303 to S2305 has been completed for all dependent setting sheets. If the generation of the dependent setting PrintTicket has been completed for all dependent setting sheets (YES in step S2306), then in step S2307, the least common multiple print setting generation unit 1004 combines the common setting PrintTicket and all dependent setting PrintTickets to generate the least common multiple print setting values 1103. Then, the least common multiple print setting generation unit 1004 terminates the processing of this routine. The least common multiple print setting values 1103 are stored in, for example, the ROM 102 and can be repetitively used.

FIG. 15 illustrates examples of the classified print setting value information 1602. FIG. 16 illustrates an example method for generating the least common multiple print setting values 1103.

As illustrated in FIG. 15, the classified print setting value information 1602 includes, for example, common setting values, dependent setting values A, and dependent setting values B. The setting values illustrated in FIG. 15 correspond to the common setting item, the dependent setting item A, and the dependent setting item B of the common function classification information 1102 illustrated in FIG. 7, although only the Options selected using the alternate UI 1101 are left and other Options not selected are deleted.

As illustrated in FIG. 16, in the first exemplary embodiment, the setting value information combining processing unit 1603 generates the least common multiple print setting values 1103 as a PrintTicket (FIG. 27). Therefore, a tag <PrintTicket> is added. The setting value information combining processing unit 1603 stores the Features and the Options of the common setting values in the least common multiple print setting values 1103 and also stores the Features and the Options of the printer specified values.

Regarding the item whose Option is "usage of common setting item", the setting value information combining processing unit 1603 does not store corresponding Features and Options. Then, the setting value information combining processing unit 1603 performs the above-described processing for all of the extracted printer drivers and generates the least common multiple print setting values 1103 as the PrintTicket.

Processing performed by the printer driver A 114 in response to reception of the least common multiple print setting values 1103 and rendering data is described below with reference to FIG. 17.

First, the printer driver A 114 recognizes the least common multiple print setting values 1103 as an ordinary PrintTicket.

Then, in the rendering data processing unit 209, a Feature confirmation unit 1901 extracts the Features and the Options from the least common multiple print setting values 1103 of the received PrintTicket. Next, a Feature valid/invalid determination unit 1902 of the printer driver 114 determines whether each extracted Feature can be processed. The Features, if determined as being processible, and the Options are sent to a rendering data analysis/print command generation unit 1903. The rendering data analysis/print command generation unit 1903 can perform rendering processing based on the received values (Features and Options) or can reflect the received values to a print command.

As illustrated in FIG. 10, the printer driver A 114 cannot "perform borderless printing." Therefore, even if the least common multiple print setting values 1103 includes the Feature "perform borderless printing", the Feature valid/invalid determination unit 1902 of the printer driver A 114 determines that the Feature "perform borderless printing" is not processible. Accordingly, the printer driver A 114 can use only the common setting values and the printer A specified setting values.

On the other hand, when the printer driver B 307 receives the least common multiple print setting values 1103 and the rendering data, the printer driver B 307 cannot "rotate printing orientation by 180°" as illustrated in FIG. 10. Therefore, a Feature valid/invalid determination unit of the printer driver B 307 determines that the Feature "rotate printing orientation by 180°" is not processible. Accordingly, the printer driver B 307 can use only the common setting values and the printer B specified setting values.

As described above, the first exemplary embodiment can directly process the print setting information generated by the user using the alternate UI 1101 after the least common multiple print setting values 1103 are generated, when the least common multiple print setting values 1103 are sent to any one of the printer drivers.

Accordingly, when a plurality of printer drivers and a plurality of printing apparatuses are usable, a user can easily identify and select an optimum printing apparatus having desired functions. As the alternate UI 1101 is a common user interface, the user can easily perform setting operations. As the print setting information of the alternate UI 1101 can be commonly used among the plurality of printing apparatuses, the print setting information can be effectively used not only for the target printing apparatus subjected to the print settings but also for another printing apparatus. Moreover, when a direct print of electronic data which is generated beforehand is performed, the printing apparatus using the alternate UI 1101 for print settings enables the user to obtain intended output products.

A second exemplary embodiment of the present invention is described below. According to the first exemplary embodiment, as described above, the common setting sheet summarizes the functions (Features) whose names are commonly used for a plurality of printer drivers and the specified setting sheet describes device specified functions (Features). Therefore, if different Feature names are used for the same function, the print setting alternate function processing unit 301 cannot recognize that the different Feature names indicate the same function and accordingly classifies these names into individual specified setting sheets. FIG. 18 illustrates example functions that are similar but may be regarded as different functions in the common function classification information 1102.

Regarding a function for stapling printed sheets together, the Feature name can be selected from "staple", "staple sort", "stapling machine", and "finishing (post-processing of print processing)." In particular, a name of each function is dependent on each vendor of the printing apparatus. For example, the dependent setting item A indicating the printer A specified setting item of the common function classification information 1102 includes a Feature name "staple sort." The dependent setting item B indicating the printer B specified setting item includes a Feature name "finishing." In this case, due to difference between the Feature names, similar functions cannot be summarized into the common setting sheet and separately described in respective printing apparatus specified setting sheets. Thus, user's setting operations become complicated.

Figure 19:
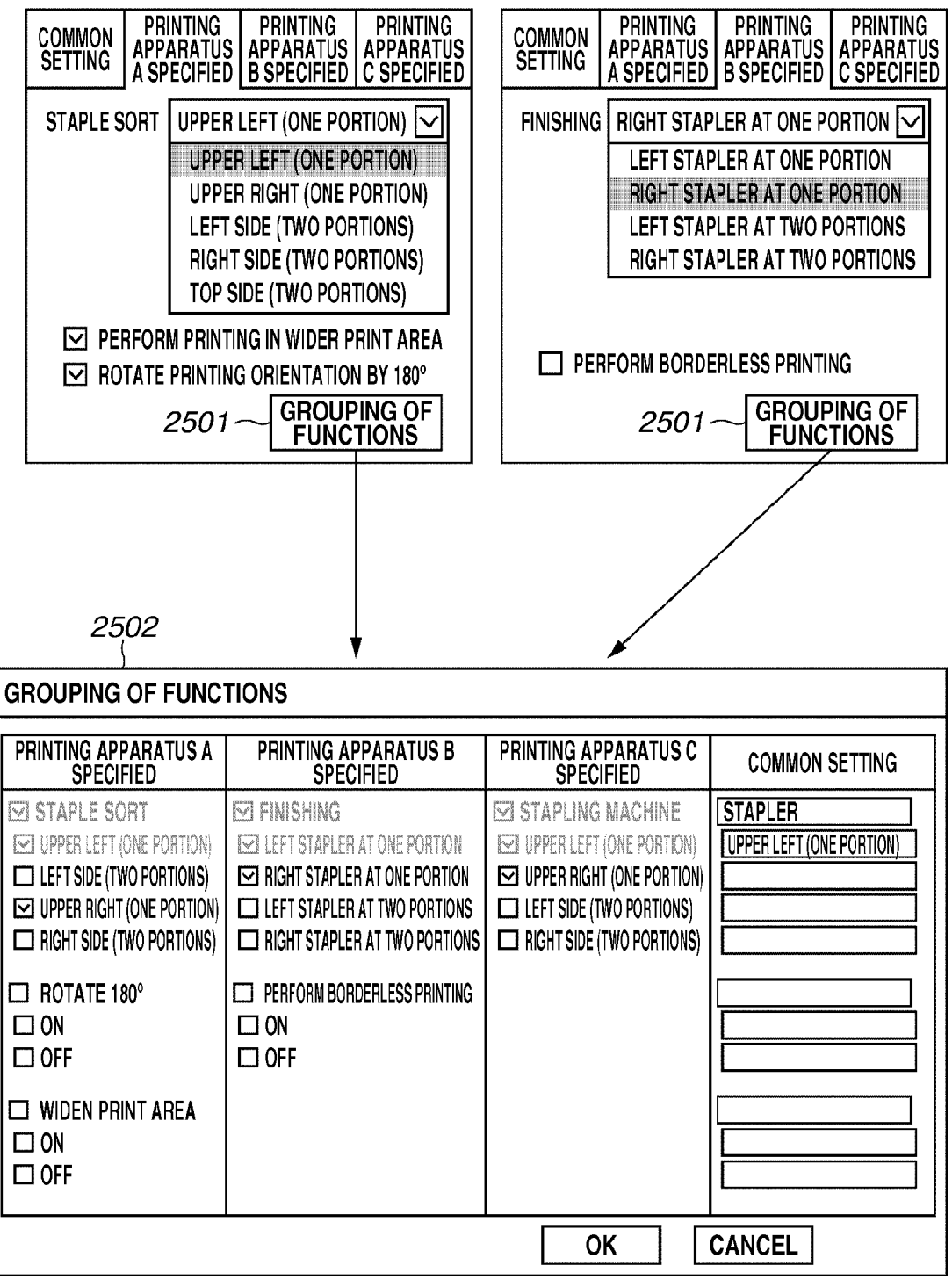
FIG. 19 illustrates an outline of grouping of functions according to a second exemplary embodiment.

In the second exemplary embodiment, to solve the above-described problem, the driver function corresponding UI generation unit 1003 generates, for each printer driver, a device specified setting sheet including a button that enables a user to instruct grouping of functions. For example, as illustrated in FIG. 19, an additional button "grouping of functions" can be newly provided. When the "grouping of functions" button 2501 is operated by a user, an UI including all of the Feature names and the Option names described in the dependent setting item of the common function classification information 1102 is displayed to enable the user to select the function (s) to be included in the common setting sheet.

FIG. 19 illustrates an example UI 2502 displayed as a dialog box "grouping of functions." The UI 2502 includes, for example, a printing apparatus A specified portion which describes the Feature names and the Option names defined in the dependent setting item A of the common function classification information 1102. The UI 2502 further includes a printing apparatus B specified portion which describes the Feature names and the Option names defined in the dependent setting item B of the common function classification information 1102. The UI 2502 further includes a printing apparatus C specified portion which describes the Feature names and the Option names defined in the dependent setting item C of the common function classification information 1102. To enable the user to select desired ones, check boxes are added to the Feature names and the Option names. The UI 2502 further includes a common setting portion which includes text boxes to allow the user to edit a display pattern of the common setting sheet.

In the example illustrated in FIG. 19, a Feature name "stapler" in the common setting portion is allocated to a grouping of "staple sort" of the printing apparatus A specified portion, "finishing" of the printing apparatus B specified portion, and "stapling machine" of the printing apparatus C specified portion. Similarly, an Option name "upper left (one portion)" in the common setting portion is allocated to a grouping of "upper left (one portion)" of the printing apparatus A specified portion, "left stapler at one portion" of the printing apparatus B specified portion, and "upper left (one portion)" of the printing apparatus C specified portion. In FIG. 19, a gray-out display indicates the Feature names and the Option names which have been subjected to the function grouping processing.

According to the example illustrated in FIG. 19, a user intends to make a new group of "upper right (one portion)" of the printing apparatus A specified portion, "right stapler at one portion" of the printing apparatus B specified portion, and "upper right (one portion)" of the printing apparatus C specified portion. More specifically, the user checks boxes of the fourth item of the printing apparatus A specified portion, the third item of the printing apparatus B specified portion, and the third item of the printing apparatus C specified portion.

In this state, if the user inputs an arbitrary character string (e.g., "upper right (one portion)" in the third text box of the common setting portion and presses an "OK" button, the character string is allocated as a new Option name and added to the common setting item. Thus, the above-described Option items relating to the Feature "stapler" are displayed in the common setting portion every time when the alternate UI 1101 is displayed. The function classification processing unit 1202 and the classification UI generation unit 1203 of the driver function corresponding UI generation unit 1003 perform the function grouping processing for the UI 2502.

FIG. 20 illustrates an example change of the common function classification information 1102 according to the grouping of functions.

First, similar to the first exemplary embodiment, the function classification processing unit 1202 generates the common function classification information 1102 (see an upper part of FIG. 20). According to the illustrated example, only one Feature name "resolution" is present in the common setting item. On the other hand, the Feature name "staple sort" is present in the dependent setting item A and the Feature name "finishing" is present in the dependent setting item B. In this manner, before the function grouping processing is performed, similar functions are separately described in the specified setting sheets.

However, if the user presses the "grouping of functions" button 2501 to perform the function grouping processing, a new Feature name "stapler" is added to the common setting item and a new Option name "upper right (one portion)" is added. On the other hand, the corresponding names ("finishing" and "staple sort") are deleted from the dependent setting items. Accordingly, the setting items relating to the Features "finishing" and "staple sort" are included in the common setting sheet when the alternate UI 1101 is displayed next time.

The function classification processing unit 1202 generates a function grouping Map table 2701 to change the common function classification information 1102 as described above. FIG. 21 illustrates an example of the function grouping Map table 2701. In the function grouping Map table 2701, the type of Feature name or Option name and dependent setting items are associated for each common setting item which is newly generated by the user using the UI 2502.

Figure 22:
FIG. 22 illustrates an example alternate UI which is generated according to the second exemplary embodiment.

FIG. 22 illustrates an example of the alternate UI 1101 which is generated and displayed based on the changed common function classification information 1102.

Figure 23:
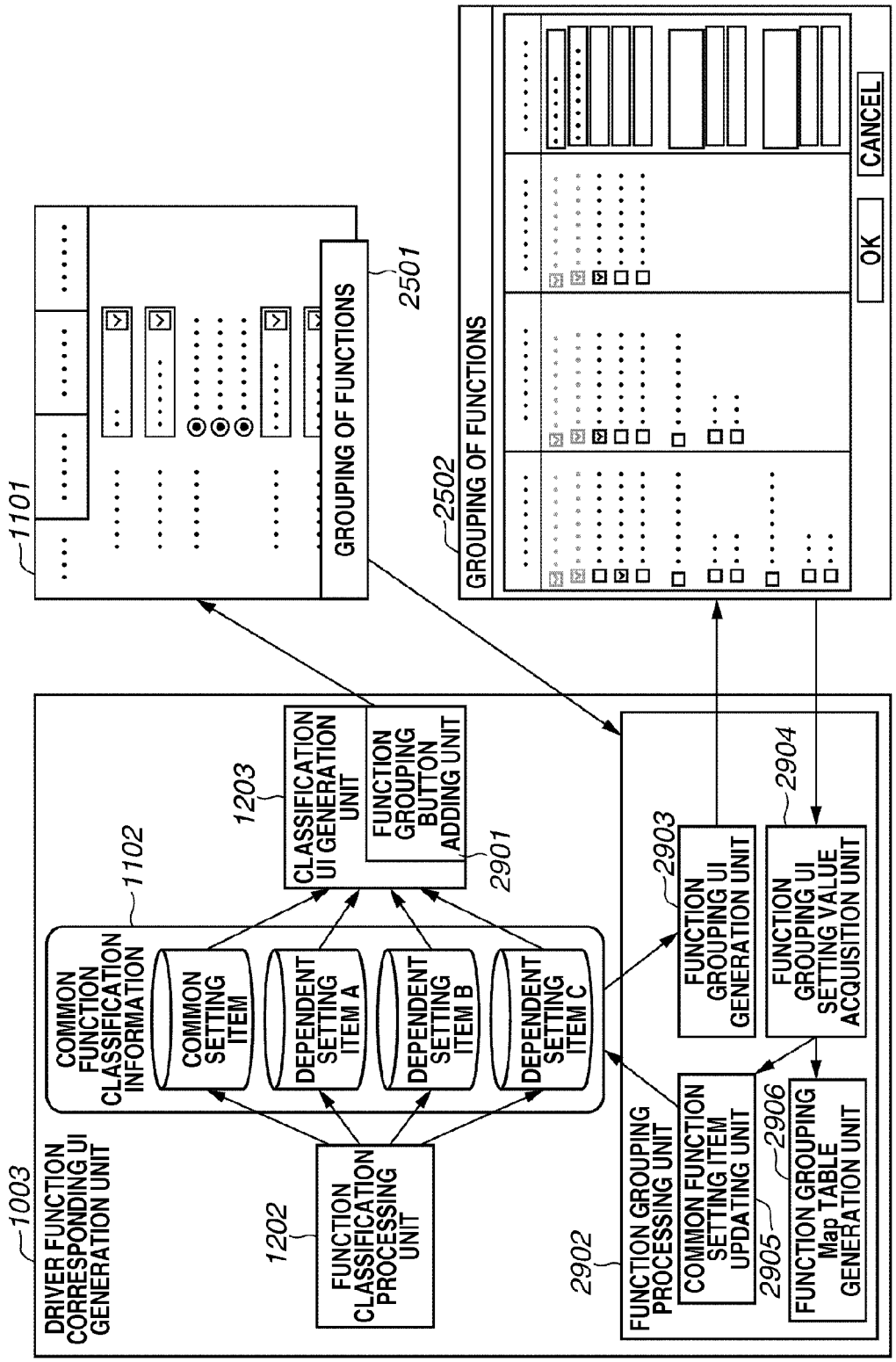
FIG. 23 illustrates example processing performed in the second exemplary embodiment.

FIG. 23 summarizes the processing performed in the second exemplary embodiment. As illustrated in FIG. 23, in the second exemplary embodiment, the driver function corresponding UI generation unit 1003 includes a function grouping button adding unit 2901 and a function grouping processing unit 2902.

The function grouping button adding unit 2901 adds the "grouping of functions" button 2501 in the device specified setting sheet when the classification UI generation unit 1203 generates the alternate UI 1101. The "grouping of functions" button 2501 has a function for automatically activating the function grouping processing unit 2902 when the "grouping of functions" button 2501 is operated. Therefore, the function grouping processing unit 2902 starts its operation when the user presses the "grouping of functions" button 2501.

When the function grouping processing unit 2902 is activated, a function grouping UI generation unit 2903 included within extracts each dependent setting item from the common function classification information 1102 and generates the UI 2502 for grouping of the functions based on the extracted dependent setting items.

If the user performs "grouping of functions" setting using the generated UI 2502 for grouping of the functions and presses the OK button to finalize the setting, the function grouping processing unit 2902 activates a function grouping UI setting value acquisition unit 2904. The function grouping UI setting value acquisition unit 2904 acquires, from the UI 2502, the Feature names and the Option names in the common setting item and the dependent setting item which are allocated by the user. Then, the function grouping UI setting value acquisition unit 2904 sends the acquired information to a common function setting item updating unit 2905 and a function grouping Map table generation unit 2906 in the function grouping processing unit 2902.

The function grouping Map table generation unit 2906 generates the function grouping Map table 2701 based on the information received from the function grouping UI setting value acquisition unit 2904. The common function setting item updating unit 2905 changes the common function classification information 1102 based on the information acquired from the function grouping UI setting value acquisition unit 2904 as illustrated in FIG. 20.

When the common function classification information 1102 is updated, the function grouping processing unit 2902 terminates its processing.

Then, processing similar to that described in the first exemplary embodiment is performed.

As described above, the second exemplary embodiment provides the UI 2502 for grouping of functions, based on the dependent setting items of respective printing apparatuses in the common function classification information 1102. Thus, a user can make a group of functions using the UI 2502 when the functions are different in the Feature name but similar in the content of the function. An alternate UI 1101 is newly generated based on a result of function grouping processing. The newly generated alternate UI 1101 includes the Feature names and the Option names, which are functionally the same, in the common setting sheet. Therefore, the user can easily operate the alternate UI 1101.

The print setting processing apparatus is not limited to the above-described exemplary embodiment illustrated in FIG. 1 and can be constituted as a single device or a system including a plurality of devices connected via a network (e.g., a local area network (LAN) or a wide area network (WAN)).

A computer can execute software program to realize the above-described exemplary embodiments of the present invention. Any means for supplying the software program to the computer, such as a compact disc-ROM (CD-ROM) storing the program or comparable computer-readable recording media or the Internet or comparable communication media capable of transmitting the program can constitute the exemplary embodiments of the present invention. The above-described program is an exemplary embodiment of the present invention. The present invention encompasses the above-described program, recording media, communication media, and related program products. According to the exemplary embodiments of the present invention, common items applicable to respective printer drivers and specified items applicable to a part of the printer drivers are separately classified. The integrated information including both the common items and the specified items is transferred to the printer drivers. Therefore, a user can perform settings of each printer driver based on the integrated information. Accordingly, the user can easily perform setting operations for each printer driver.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-070411 filed Mar. 18, 2008, which is hereby incorporated by reference herein in its entirety.

What is claimed is:

1. A print setting processing apparatus comprising:
a functional information acquisition unit configured to acquire functional information which is set for each of a plurality of printer drivers;
a classification unit configured to display a common item applicable to a plurality of printers, a first dependent item uniquely applicable to a first printer and a second dependent item uniquely applicable to a second printer in an identifiable manner based on the acquired functional information by the functional information acquisition unit, wherein each of the common item, the first dependent item and the second dependent item is displayed on a different sheet;
a generation unit configured to generate integrated functional information including the common item and dependent item; and
a transfer unit configured to transfer the integrated functional information to the printer drivers.

2. The print setting processing apparatus according to claim 1, further comprising:
a change acceptance unit configured to receive a change instruction directed to the common item and the specified item; and
a changing unit configured to change the common item and dependent item included in the integrated functional information based on the change instruction.

3. The print setting processing apparatus according to claim 1, further comprising a storage unit configured to store the integrated functional information.

4. The print setting processing apparatus according to claim 1, further comprising:
a selection unit configured to select dependent item to be incorporated in the common item; and
an incorporation unit configured to delete dependent item selected by the selection unit and add the selected dependent item to the common item.

5. The print setting processing apparatus according to claim 1, wherein the functional information acquisition unit acquires the functional information from a printer driver which satisfies a predetermined condition among the plurality of printer drivers installed in the information processing apparatus.

6. A method for processing a print setting, the method comprising:
acquiring functional information which is set for each of a plurality of printer drivers;
displaying a common item applicable to a plurality of printers, a first dependent item uniquely applicable to a first printer and a second dependent item uniquely applicable to a second printer in an identifiable manner based on the acquired functional information by the functional information acquisition unit, wherein each of the common item, the first dependent item and the second dependent item is displayed on a different sheet;
generating integrated functional information including the common item and dependent item; and
transferring the integrated functional information to the printer drivers.

7. A computer-readable storage medium storing a program causing a computer to execute a method comprising:
acquiring functional information which is set for each of a plurality of printer drivers;
displaying a common item applicable to a plurality of printers, a first dependent item uniquely applicable to a first printer and a second dependent item uniquely applicable to a second printer in an identifiable manner based on the acquired functional information by the functional information acquisition unit, wherein each of the common item, the first dependent item and the second dependent item is displayed on a different sheet;
generating integrated functional information including the common item and the specified item; and
transferring the integrated functional information to the printer drivers.

8. A print setting processing apparatus comprising:
a functional information acquisition unit configured to acquire functional information from a plurality of printer drivers;
a display unit configured to display a setting screen including a common item applicable to the plurality of printer drivers and a first dependent item uniquely applicable to a first printer and a second dependent item uniquely applicable to a second printer in an identifiable manner based on the acquired functional information by the functional information acquisition unit, wherein each of the common item, the first dependent item and the second dependent item is displayed on a different sheet; and
a generation unit configured to generate a print command based on a setting content entered using the setting screen displayed by the display unit.

* * * * *